(12) United States Patent
Tonkovich et al.

(10) Patent No.: US 7,029,647 B2
(45) Date of Patent: Apr. 18, 2006

(54) PROCESS FOR PRODUCING HYDROGEN PEROXIDE USING MICROCHANNEL TECHNOLOGY

(75) Inventors: Anna Lee Tonkovich, Marysville, OH (US); Kai Tod Paul Jarosch, Bexley, OH (US); David John Hesse, Columbus, OH (US)

(73) Assignee: Velocys, Inc., Plain City, OH (US)

( * ) Notice: Subject to any disclaimer, the term of this patent is extended or adjusted under 35 U.S.C. 154(b) by 172 days.

(21) Appl. No.: 10/765,705

(22) Filed: Jan. 27, 2004

(65) Prior Publication Data

US 2005/0163701 A1    Jul. 28, 2005

(51) Int. Cl.
*C01B 15/029* (2006.01)

(52) U.S. Cl. ..................... 423/584; 165/186

(58) Field of Classification Search ............... 423/584, 423/659

See application file for complete search history.

(56) References Cited

U.S. PATENT DOCUMENTS

| | | | |
|---|---|---|---|
| 3,336,112 A | 8/1967 | Hooper | 23/207 |
| 4,389,390 A | 6/1983 | Dalton, Jr. et al. | 423/584 |
| 4,392,362 A | 7/1983 | Little | 62/514 |
| 4,516,632 A | 5/1985 | Swift et al. | 165/167 |
| 4,576,687 A | 3/1986 | Hertl et al. | 204/157.5 |
| 4,681,751 A | 7/1987 | Gosser | 423/584 |
| 4,772,458 A | 9/1988 | Gosser et al. | 423/584 |
| 4,832,938 A | 5/1989 | Gosser et al. | 423/584 |
| 4,889,705 A | 12/1989 | Gosser | 423/584 |
| 5,104,635 A | 4/1992 | Kanada et al. | 423/584 |
| 5,135,731 A | 8/1992 | Gosser et al. | 423/584 |
| 5,309,637 A | 5/1994 | Moriarty | 29/890.054 |
| 5,317,805 A | 6/1994 | Hoopman et al. | 29/890.03 |
| 5,611,214 A | 3/1997 | Wegeng et al. | 62/498 |
| 5,727,618 A | 3/1998 | Mundinger et al. | 165/80.4 |
| 5,811,062 A | 9/1998 | Wegeng et al. | 422/129 |
| 5,853,693 A | 12/1998 | Ogasawara et al. | 423/588 |
| 5,858,314 A | 1/1999 | Hsu et al. | 422/211 |
| 6,126,723 A | 10/2000 | Drost et al. | 96/4 |
| 6,126,914 A | 10/2000 | Ogasawara et al. | 423/588 |
| 6,129,973 A | 10/2000 | Martin et al. | 428/166 |
| 6,192,596 B1 | 2/2001 | Bennett et al. | 34/76 |
| 6,200,536 B1 | 3/2001 | Tonkovich et al. | 422/177 |
| 6,216,343 B1 | 4/2001 | Leland et al. | 29/890.032 |
| 6,220,497 B1 | 4/2001 | Benz et al. | 228/118 |
| 6,224,845 B1 | 5/2001 | Pennetreau et al. | 423/584 |

(Continued)

FOREIGN PATENT DOCUMENTS

DE    198 16 296 A1    10/1999

(Continued)

OTHER PUBLICATIONS

Kumar et al.; "Direct Synthesis of Hydrogen Peroxide"; Paper 546e, AIChE Annual Meeting 2004; 2004 UOP LLC, no month.

(Continued)

*Primary Examiner*—Wayne A. Langel
(74) *Attorney, Agent, or Firm*—Renner, Otto, Boisselle & Sklar, LLP (57) ABSTRACT

This invention relates to a process for making hydrogen peroxide in a microchannel reactor. The process comprises flowing a process feed stream and a staged addition feed stream in a process microchannel in contact with each other to form a reactant mixture comprising $O_2$ and $H_2$, and contacting a catalyst with the reactant mixture in the process microchannel to convert the reactant mixture to a product comprising hydrogen peroxide; transferring heat from the process microchannel to a heat exchanger; and removing the product from the process microchannel.

70 Claims, 5 Drawing Sheets

U.S. PATENT DOCUMENTS

| | | | |
|---|---|---|---|
| 6,230,408 B1 | 5/2001 | Ehrfeld et al. | 29/890.039 |
| 6,299,852 B1* | 10/2001 | Nystrom et al. | 423/584 |
| 6,313,393 B1 | 11/2001 | Drost | 136/201 |
| 6,342,196 B1 | 1/2002 | Beckman et al. | 423/588 |
| 6,352,577 B1 | 3/2002 | Martin et al. | 96/4 |
| 6,381,846 B1 | 5/2002 | Insley et al. | 29/890.039 |
| 6,415,860 B1 | 7/2002 | Kelly et al. | 165/748 |
| 6,488,838 B1* | 12/2002 | Tonkovich et al. | 208/108 |
| 6,540,975 B1* | 4/2003 | Tonkovich et al. | 423/659 |
| 6,576,214 B1 | 6/2003 | Zhou et al. | 423/584 |
| 6,616,909 B1* | 9/2003 | Tonkovich et al. | 423/648.1 |
| 6,675,875 B1 | 1/2004 | Vafai et al. | 165/80.4 |
| 6,680,044 B1* | 1/2004 | Tonkovich et al. | 423/652 |
| 6,746,651 B1 | 6/2004 | Ponzo et al. | 422/220 |
| 6,746,819 B1 | 6/2004 | Schmitz et al. | 430/272.1 |
| 6,747,178 B1 | 6/2004 | Harston et al. | 570/175 |
| 6,749,814 B1 | 6/2004 | Bergh et al. | 422/130 |
| 6,749,817 B1 | 6/2004 | Mulvaney, III | 422/200 |
| 6,755,211 B1 | 6/2004 | O'Connor et al. | 137/554 |
| 6,756,340 B1 | 6/2004 | Voskoboynikov et al. | 502/328 |
| 6,756,515 B1 | 6/2004 | Rende et al. | 585/444 |
| 6,764,660 B1 | 7/2004 | Wiede, Jr. et al. | 422/198 |
| 6,769,444 B1 | 8/2004 | Guzman et al. | 137/15.01 |
| 6,770,245 B1 | 8/2004 | Akporiaye et al. | 422/82.12 |
| 6,773,684 B1 | 8/2004 | Lesieur et al. | 422/198 |
| 6,946,113 B1* | 9/2005 | Seaba et al. | 423/648.1 |
| 6,969,505 B1* | 11/2005 | Tonkovich et al. | 423/648.1 |
| 2003/0180216 A1* | 9/2003 | TeGrotenhuis et al. | 423/659 |
| 2004/0104010 A1 | 6/2004 | Kenny et al. | 165/80.4 |
| 2004/0107831 A1 | 6/2004 | Graham et al. | 95/96 |
| 2004/0123626 A1 | 7/2004 | Caze et al. | 65/17.2 |
| 2004/0125689 A1 | 7/2004 | Ehrfeld et al. | 366/165.1 |
| 2004/0127352 A1 | 7/2004 | Jin et al. | 502/322 |
| 2004/0130057 A1 | 7/2004 | Mehrabi et al. | 264/171.13 |
| 2004/0131345 A1 | 7/2004 | Kylberg et al. | 392/465 |
| 2004/0131507 A1 | 7/2004 | Saitmacher et al. | 422/111 |
| 2004/0131829 A1 | 7/2004 | Joseph et al. | 428/166 |
| 2004/0132832 A1 | 7/2004 | Espinoza et al. | 518/716 |
| 2004/0136902 A1 | 7/2004 | Plath et al. | 423/651 |
| 2004/0141893 A1 | 7/2004 | Martin | 422/198 |
| 2004/0143059 A1 | 7/2004 | Cabrera | 524/800 |
| 2004/0144421 A1 | 7/2004 | Parce et al. | 137/14 |
| 2004/0156762 A1 | 8/2004 | Schuppich et al. | 422/191 |

FOREIGN PATENT DOCUMENTS

| | | |
|---|---|---|
| EP | 1 311 341 B1 | 8/2001 |
| EP | 0 904 608 B1 | 12/2001 |
| EP | 1 362 634 A1 | 11/2003 |
| WO | 97/32687 | 9/1997 |
| WO | 98/55812 | 12/1998 |
| WO | 00/06295 | 2/2000 |
| WO | 01/10773 A1 | 2/2001 |
| WO | 01/12312 A2 | 2/2001 |
| WO | 01/54807 A1 | 8/2001 |
| WO | 01/95237 A2 | 12/2001 |
| WO | 02/18042 A1 | 3/2002 |
| WO | 03/026788 | 4/2003 |
| WO | 03/048034 A1 | 6/2003 |
| WO | 03/078052 A1 | 9/2003 |
| WO | 03/106386 A2 | 12/2003 |
| WO | 2004/045760 | 6/2004 |
| WO | 2004/050799 | 6/2004 |
| WO | 2004/052518 | 6/2004 |
| WO | 2004/052530 | 6/2004 |
| WO | 2004/052941 | 6/2004 |
| WO | 2004/054013 | 6/2004 |
| WO | 2004/054696 | 7/2004 |
| WO | 2004/062790 | 7/2004 |
| WO | 2004/062791 | 7/2004 |
| WO | 2004/062792 | 7/2004 |
| WO | 2004/067160 | 8/2004 |
| WO | 2004/067444 | 8/2004 |
| WO | 2004/067492 | 8/2004 |
| WO | 2004/067708 | 8/2004 |
| WO | 2004091771 A1 | 10/2004 |
| WO | 2004092771 A1 | 10/2004 |

OTHER PUBLICATIONS

VandenBussche; "Direct Synthesis of Hydrogen Peroxide: Fundamentals and Conceptual Designs"; GFF 05 Symposium, Mar. 1, 2005; 2005 UOP LLC.

International Search Report and Written Opinion, Application No. PCT/US2004/041621, mailed Apr. 11, 2005.

Janicke et al.; The Controlled Oxidation of Hydrogen from an Explosive Mixture of Gases Using a Microstructured Reactor/Heat Exchanger and Pt/Al$_2$O$_3$ Catalyst; *Journal of Catalysis*, 191, pp. 282-293; 2000, no month.

Matlosz et al.; "Microreactors as Tools in Chemical Research"; Microreaction Technology; IMRET 5: Proceedings of the Fifth International Conference on Microreaction Technology, no date.

Srinivasn et al.; "Micromachined Reactors for Catalytic Partial Oxidation Reactions"; AIChE Journal; Nov. 1997; vol. 43, No. 11; pp. 3059-3069.

TeGrotenhuis et al.; Optimizing Microchannel Reactors by Trading-Off Equilibrium and Reaction Kinetics through Temperature Management; Prepared for presentation at IMRET 6—6th International Conference on Microreaction Technology; Mar. 2002.

Wegeng et al.; "Compact Fuel Processors for Fuel Cell Powered Automobiles Based on Microchannel Technology"; Fuel Cells Bulletin No. 28; pp. 8-13, no date.

Rostami et al.; "Flow and Heat Transfer for Gas Flowing in Microchannels: a Review"; Heat and Mass Transfer 38 (2002) 359-367, no month.

Wan et al.; "1-Pentene Epoxidation in Titanium Silicalite-1 Microchannel Reactor: Experiments and Modelling"; Institution of Chemical Engineers; Trans IchemE; vol. 81, Part,1, Aug. 2003.

The New Jersey Center for MicroChemical Systems (NJCMCS); "Engineering Research in the Realm of the Very Small"; On-Site Production of Hydrogen Peroxide Using Microchannel Reactor Technology; Dec. 12, 2003; http://www.njcmcs.org/projects.htm.

Chemicals Project Fact Sheet; Microchannel Reactor System Design; "Microchannel Reactor Systems Could Allow for Energy-Efficient and Cost-Effective On-Site Hydrogen Peroxide Production"; Office of Industrial Technologies; U.S. Department of Energy; Feb. 2003.

A New Efficient Safe Direct Hydrogen Peroxide Process; "This New Clean Process May Replace the Existing Solvent -Based, Indirect Process Due To Its Simplicity, Reduced Energy Consumption and Lower Capital/Operating Costs"; Office of Weatherization and Integovernmental Program; U.S. Department of Energy; Aug. 2002.

Svajda et al.; "Development of Catalytic Membranes for Direct Synthesis of Hydrogen Peroxide"; Karl-Winnacker-Institut., May 1, 2002.

Rogers; Process Intensification; American Institute of Chemical Engineers; "Microchannel Reactor System for On-site H2O2 Production by Controlled H2/O2 Reaction"; Topical Conference Proceedings; Spring National Meeting, Mar. 30-Apr. 3, 2003.

"Catalytic Synthesis of Hydrogen Peroxide"; Chemical Week, Sep. 10, 2003, 39.

Lietze; "Crimped Metal Ribbon Flame Arrestors for the Protection of Gas Measurement Systems"; Journal of Loss Prevention in the Process Industries, vol. 15, Issue 1, Jan. 2002, pp. 29-35 (Abstract).

Waku et al.; "Effects of $O_2$ Concentration on the Rate and Selectivity in Oxidative Dehydrogenation of Ethane Catalyzed by Vanadium Oxide: Implications for $O_2$ Staging and Membrane Reactors"; Ind. Eng. Chem. Res., 2003, 42, 5462-5466, no month.

Besser, Ronald S. "New Directions in Reactor Design Through Miniaturization". Sep. 13, 2002, Tulane Engineering Forum.

Ouyang et al. "Flexible Microreactor System for Chemical Research at Moderate and High Temperatures". Stevens Institute of Technology, no date.

* cited by examiner

PROCESS FOR PRODUCING HYDROGEN PEROXIDE USING MICROCHANNEL TECHNOLOGY

TECHNICAL FIELD

This invention relates to a process for producing hydrogen peroxide ($H_2O_2$) using microchannel technology.

BACKGROUND OF THE INVENTION

Hydrogen peroxide is typically manufactured by a process known as autoxidation, which produces hydrogen peroxide at about 70% by weight concentration through an energy intensive distillation stage. Because most hydrogen peroxide commercial applications use low hydrogen peroxide concentrations (about 15% by weight), the 70% by weight hydrogen peroxide solution must be diluted prior to storage and use. End users have increasingly become interested in the concept of on-site, on-demand hydrogen peroxide generation to reduce transportation costs, storage, and concentration dilution costs. However, combining $H_2$ and $O_2$ in conventional reactor systems is difficult at $H_2$ concentrations above about five percent by weight, as the mixture becomes flammable and even explosive. At low $H_2$ concentrations, the rate of $H_2$ diffusion in the liquid phase is extremely slow, thus necessitating the use of very high pressures, and rendering the process energy inefficient. The solubility of $H_2$ in the liquid phase can be improved by adding $H_2SO_4$ and halide ions, but both pose serious corrosion and contamination problems.

The present invention provides a solution to these problems. With the present invention it is possible to provide on-site direct combination of $H_2$ and $O_2$ using a microchannel reactor. This reactor possesses a high surface-to-volume ratio and exhibits enhanced heat and mass transfer rates. In one embodiment, the microchannel reactor allows for $H_2$ concentrations above about five percent by weight without the risk of explosion, while providing a low-pressure, energy-efficient operation that is safe.

SUMMARY OF THE INVENTION

This invention relates to a process for making hydrogen peroxide in a microchannel reactor. The process comprises flowing a process feed stream and a staged addition feed stream in contact with each other in a process microchannel to form a reactant mixture comprising $O_2$ and $H_2$, and contacting a catalyst with the reactant mixture in the process microchannel to convert the reactant mixture to a product comprising hydrogen peroxide; transferring heat from the process microchannel to a heat exchanger; and removing the product from the process microchannel.

In one embodiment, the heat exchanger comprises a heat exchange channel adjacent to the process microchannel. In one embodiment, the heat exchange channel is a microchannel.

BRIEF DESCRIPTION OF THE DRAWINGS

In the annexed drawings, like parts and features have like designations.

DETAILED DESCRIPTION OF THE INVENTION

Figures 1, 2:
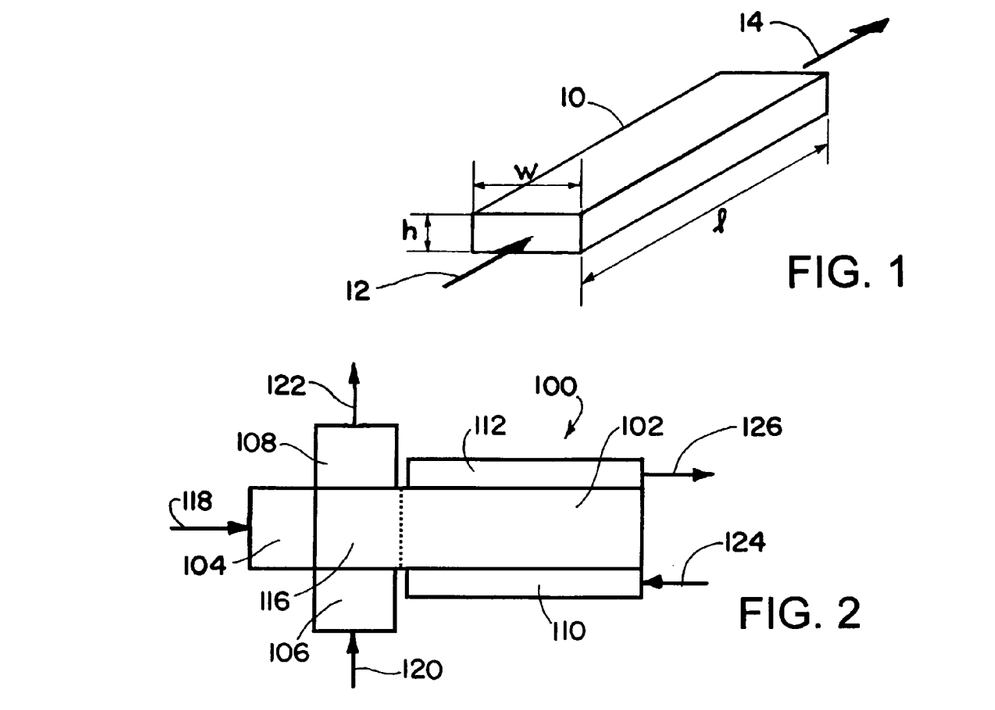
FIG. 1 is a schematic illustration of a microchannel that may be used with the inventive process.
FIG. 2 is a schematic flow sheet illustrating the inventive process in a particular form wherein $H_2$ and $O_2$ flow in a microchannel reactor in contact with a catalyst and react to form hydrogen peroxide.

The term "microchannel" refers to a channel having at least one internal dimension of height or width of up to about 10 millimeters (mm), and in one embodiment up to about 5 mm, and in one embodiment up to about 2 mm, and in one embodiment up to about 1 mm. An example of a microchannel that may be used with the inventive process as a process microchannel and/or a heat exchange microchannel is illustrated in FIG. 1. The microchannel 10 illustrated in FIG. 1 has a height (h), width (w) and length (l). Fluid flows through the microchannel 10 in a direction that is perpendicular to both the height and width as indicated by directional arrows 12 and 14. The height (h) or width (w) of the microchannel may be in the range of about 0.05 to about 10 mm, and in one embodiment about 0.05 to about 5 mm, and in one embodiment about 0.05 to about 2 mm, and in one embodiment about 0.05 to about 1.5 mm, and in one embodiment about 0.05 to about 1 mm, and in one embodiment about 0.05 to about 0.75 mm, and in one embodiment about 0.05 to about 0.5 mm. In one embodiment the height or width may range from about 0.15 to about 10 mm, and in one embodiment from about 0.2 to about 10 mm, and in one embodiment from about 0.3 to about 10 mm. The other dimension of height or width may be of any dimension, for example, up to about 3 meters, and in one embodiment about 0.01 to about 3 meters, and in one embodiment about 0.1 to about 3 meters. The length (l) of the microchannel may be of any dimension, for example, up to about 10 meters, and in one embodiment about 0.2 to about 10 meters, and in one embodiment from about 0.2 to about 6 meters, and in one embodiment from 0.2 to about 3 meters. Although the microchannel 10 illustrated in FIG. 1 has a cross section that is rectangular, it is to be understood that the microchannel may have a cross section having any shape, for example, a square, circle, semi-circle, trapezoid, etc. The shape and/or size of the cross section of the microchannel may vary over its length. For example, the height or width may taper from a relatively large dimension to a relatively small dimension, or vice versa, over the length of the microchannel.

The term "microchannel reactor" refers to a reactor wherein a chemical reaction is conducted in a microchannel.

The term "adjacent" when referring to the position of one channel relative to the position of another channel means directly adjacent such that a wall separates the two channels. This wall may vary in thickness. However, "adjacent" channels are not separated by an intervening channel that would interfere with heat transfer between the channels.

The term "fluid" refers to a gas, a liquid, or a gas or a liquid containing dispersed solids, or a mixture thereof. The fluid may be in the form of a gas containing dispersed liquid droplets. The fluid may be in the form of a liquid containing dispersed liquid or gas droplets.

The term "contact time" refers to the volume of the reaction zone within the microchannel reactor divided by the volumetric feed flow rate of a fluid flowing through the reaction zone at a temperature of 0° C. and a pressure of one atmosphere.

The term "reaction zone" refers to a space within a microchannel wherein a catalyst is positioned.

The term "residence time" refers to the internal volume of a space (e.g., the reaction zone within a microchannel reactor) occupied by a fluid flowing through the space divided by the volumetric flowrate for the fluid flowing through the space at the temperature and pressure within the space.

The term "conversion of $O_2$" refers to the $O_2$ mole change between the fluid entering the process microchannels and the fluid exiting the process microchannels divided by the moles of $O_2$ in the fluid entering the process microchannels.

The term "conversion of $H_2$" refers to the $H_2$ mole change between the fluid entering the process microchannels and the fluid exiting the process microchannels divided by the moles of $H_2$ in the fluid entering the process microchannels.

The term "cycle" is used herein to refer to a single pass of the reactants through the process microchannel.

The inventive process may be conducted as illustrated in FIGS. 2–10. Referring to FIG. 2, the process is operated using microchannel reactor 100 which includes microchannel reactor core 102, process feed stream header 104, staged addition feed stream header 106, product footer 108, heat exchange header 110, heat exchange footer 112, and manifold and recuperator 116. A process feed stream comprising $O_2$ or $H_2$ flows into the microchannel reactor 100 through the process feed stream header 104, as indicated by directional arrow 118. A staged addition feed stream comprising $O_2$ or $H_2$ flows into the microchannel reactor 100 through the staged addition feed stream header 106, as indicated by directional arrow 120. It will be understood by those skilled in the art that when the process feed stream comprises $O_2$, the staged addition feed stream will comprise $H_2$. Alternatively, when the process feed stream comprises $H_2$, the staged addition feed stream will comprise $O_2$. The process feed stream and the staged addition feed stream flow into and through the manifold and recuperator 116 into the reactor core 102 wherein they are mixed with each other in one or more process microchannels to form a reactant mixture comprising $O_2$ and $H_2$. The reactant mixture contacts a catalyst within the one or more process microchannels and is converted to a product comprising hydrogen peroxide. The product flows from the reactor core 102 through the manifold and recuperator 116 to product footer 108, and from product footer 108 out of the reactor, as indicated by directional arrow 122. Although an advantage of the inventive process is that a high level of conversion of $O_2$ and/or $H_2$ may be obtained with one pass through the microchannel reactor, in one embodiment, unreacted $O_2$ and/or $H_2$ may be separated from the product using conventional techniques and recycled back through the microchannel reactor. The unreacted $O_2$ and/or $H_2$ may be recycled through the microchannel reactor any number of times, for example, one, two, three, four times, etc. A heat exchange fluid flows into heat exchange header 110, as indicated by directional arrow 124, and from heat exchange header 110 through the reactor core 102 to heat exchange footer 112, and out of heat exchange footer 112, as indicated by directional arrow 126. Heat exchange between the feed and product streams and the heat exchange fluid may be effected using convective heat transfer. In one embodiment, heat exchange may be enhanced by the heat exchange fluid undergoing a full or partial phase change in heat exchange channels in the reactor core 102. The microchannel reactor 100 is employed in conjunction with storage vessels, pumps, valves, flow control devices, and the like, which are not shown in the drawings, but would be apparent to those skilled in the art.

The process feed stream and the staged addition feed stream are mixed with each other in the one or more process microchannels in the microchannel reactor. In one embodiment, the catalyst is positioned within a reaction zone in the one or more process microchannels and the staged addition feed stream is mixed with the process feed stream in the reaction zone. In one embodiment, the one or more process microchannels contain a mixing zone and a reaction zone, the mixing zone being positioned upstream of the reaction zone, the catalyst being positioned in the reaction zone, and the staged addition feed stream is mixed with the process feed stream in the mixing zone. In one embodiment, the one or more process microchannels contain a mixing zone and a reaction zone, and the process feed stream and the staged addition feed stream are partially mixed in the mixing zone and partially mixed in the reaction zone. In one embodiment, from about 1% to about 99% by volume of the staged addition feed stream is mixed with the process feed stream in the mixing zone and the remainder of the staged addition feed stream is mixed with the process feed stream in the reaction zone. The volume of the staged addition feed stream that is mixed with the process feed stream in the mixing zone may range from about 5% to about 95% by volume, and in one embodiment from about 10% to about 90% by volume, and in one embodiment from about 20% to about 80% by volume, and in one embodiment from about 30% to about 70% by volume, and in one embodiment from about 40% to about 60% by volume, with the remainder of the staged addition feed stream being mixed with the process feed stream in the reaction zone.

The mixing of the $O_2$ and $H_2$ in the one or more process microchannels of the microchannel reactor provides the advantage of safe handling of the reactants. While not wishing to be bound by theory, it is believed that the dimensions of the microchannel reactor allow for enhanced quenching of unwanted free radical combustion reactions as well as small amounts of gaseous volume relative to the surrounding surface area of the microchannel reactor such that the potential energy of a detonation may be safely contained within the microchannel reactor.

Figure 3:
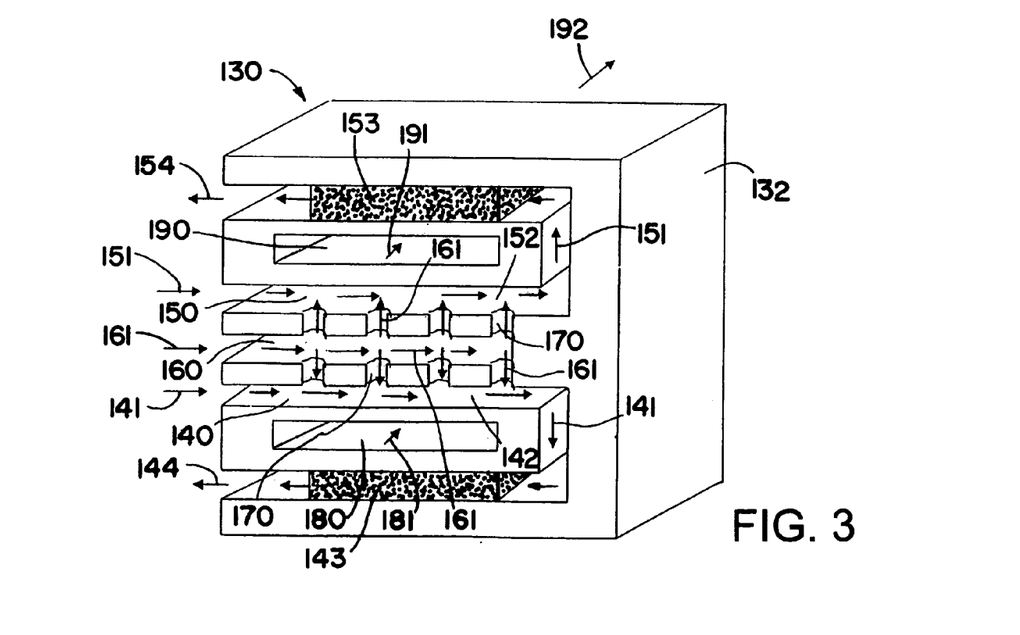
FIG. 3 is a schematic illustration of a repeating unit of process microchannels and heat exchange microchannels that may be used in the microchannel reactor core of the microchannel reactor illustrated in FIG. 2.

FIG. 3 illustrates repeating unit 130 which may be used in the reactor core 102 of the microchannel reactor 100. Repeating unit 130 is housed within housing unit 132. The inventive process is conducted using process microchannels 140 and 150, staged addition microchannel 160, orifices 170, and heat exchange channels 180 and 190. The process feed stream comprising $O_2$ or $H_2$ flows through process microchannels 140 and 150, as indicated by the directional arrows 141 and 151, respectively. The staged addition feed stream comprising $H_2$ or $O_2$ flows through the staged addition microchannel 160 into orifices 170, and from the orifices 170 into process microchannels 140 and 150, as indicated by directional arrows 161. The process microchannels 140 and 150 have mixing zones 142 and 152, respectively, wherein the process feed stream and staged addition feed stream contact each other and form a reactant mixture comprising $O_2$ and $H_2$. The process microchannels 140 and 150 also have reaction zones 143 and 153, respectively, wherein the catalyst is present and the reactant mixture contacts the catalyst and reacts to form a product comprising hydrogen peroxide. The mixing zones 142 and 152 are positioned upstream from the reaction zones 143 and 153, respectively. The product exits the process microchannels 140 and 150, as indicated by the directional arrows 144 and 154, respectively. The product exiting the process microchannels 140 and 150 flows to the manifold and recuperator 116, and from the manifold and recuperator 116 through the product footer 108 and out of the reactor, as indicated by arrow 122. Heat exchange fluid flows from heat exchange header 110 through heat exchange channels 180 and 190, as indicated by directional arrows 181, and 191 and 192, respectively, to heat exchange footer 112. The flow of heat exchange fluid in the direction indicated by arrows 181, 191 and 192 is cross-current to the flow of fluid flowing through process microchannels 140 and 150 as indicated by arrows 141 and 151, respectively. Alternatively, the heat exchange channels 180 and 190 could be oriented to provide for the flow of the heat exchange fluid in a direction that would be cocurrent or counter-current to the flow of fluid through the process microchannels 140 and 150. The repeating unit 130 illustrated in FIG. 3 may occur once within the microchannel reactor core 102 or it may be repeated any number of times, for example, two, three, four, five, ten, twenty, fifty, one hundred, hundreds, one thousand, thousands, ten thousand, tens of thousands, one hundred thousand, hundreds of thousands or millions of times.

Figure 4:
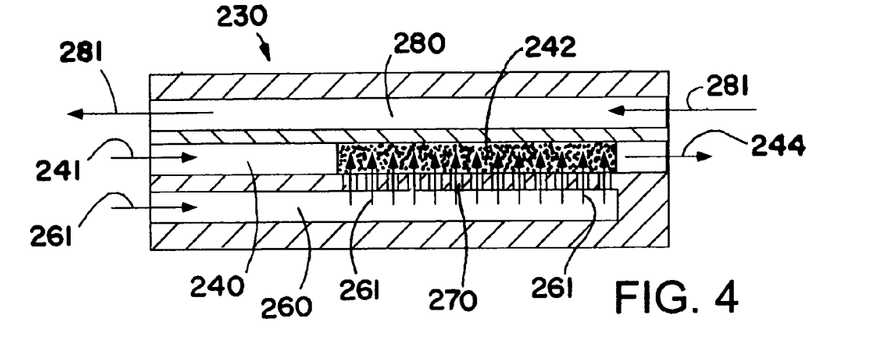
FIG. 4 is a schematic illustration of another repeating unit of a process microchannel and a heat exchange microchannel that may be used in the microchannel reactor core of the microchannel reactor illustrated in FIG. 2.

FIG. 4 illustrates repeating unit 230 which may be used in the reactor core 102 of the microchannel reactor 100. The inventive process is conducted using process microchannel 240, staged addition microchannel 260, orifices 270, and heat exchange channel 280. Process microchannel 240 has a reaction zone 242, wherein the catalyst is present. The process feed stream comprising $O_2$ or $H_2$ flows through process microchannel 240, as indicated by the directional arrow 241. The staged addition feed stream comprising $H_2$ or $O_2$ flows through the staged addition microchannel 260 into and through the orifices 270, and from the orifices 270 into the reaction zone 242 as indicated by directional arrows 261. In the reaction zone 242 the staged addition feed stream mixes with the process feed stream to form a reactant mixture comprising $O_2$ and $H_2$. The reactant mixture contacts the catalyst and reacts to form a product comprising hydrogen peroxide. The product exits the process microchannel 240, as indicated by the directional arrow 244. The product exiting the process microchannel 240 flows to the manifold and recuperator 116, and from the manifold and recuperator 116 through the product footer 108 and out of the reactor, as indicated by arrow 122. Heat exchange fluid flows from heat exchange header 110 through heat exchange channel 280, as indicated by directional arrows 281, to heat exchange footer 112. The flow of heat exchange fluid in the direction indicated by arrows 281 is counter-current to the flow of fluid flowing through process microchannel 240. Alternatively, the heat exchange channel 280 could be oriented to provide for the flow of the heat exchange fluid in a direction that would be cocurrent or cross-current to the flow of fluid through the process microchannel 240. The repeating unit 230 illustrated in FIG. 4 may occur once within the microchannel reaction zone 114 or it may be repeated any number of times, for example, two, three, four, five, ten, twenty, fifty, one hundred, hundreds, one thousand, thousands, ten thousand, tens of thousands, one hundred thousand, hundreds of thousands or millions of times.

Figure 5:
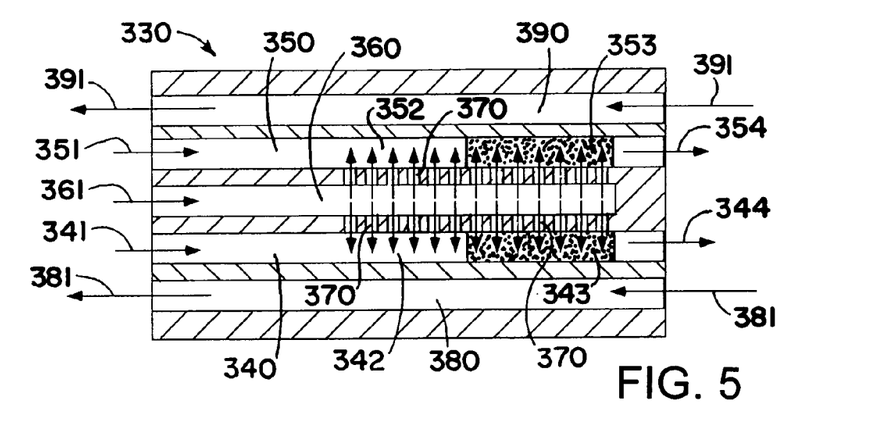
FIG. 5 is a schematic illustration of another repeating unit of process microchannels and heat exchange microchannels that may be used in the microchannel reactor core of the microchannel reactor illustrated in FIG. 2.

FIG. 5 illustrates repeating unit 330 which may be used in the reactor core 102 of the microchannel reactor 100. The inventive process is conducted using process microchannels 340 and 350, staged addition microchannel 360, orifices 370, and heat exchange channels 380 and 390. The process microchannels 340 and 350 have mixing zones 342 and 352, respectively, and reaction zones 343 and 353, respectively. The catalyst is present in the reaction zones 343 and 353. The mixing zones 342 and 352 are positioned upstream of the reaction zones 343 and 353. The process feed stream comprising $O_2$ or $H_2$ flows through process microchannels 340 and 350, as indicated by the directional arrows 341 and 351, respectively. The staged addition feed stream comprising $H_2$ or $O_2$ flows through the staged addition microchannel 360 into and through orifices 370, and from the orifices 370 into process microchannels 340 and 350, as indicated by directional arrows 361. In the process microchannels 340 and 350 a portion of the staged addition feed stream contacts and intermixes with the process feed stream in the mixing zones 342 and 352, respectively, with the result being the formation of a reactant mixture. This reactant mixture flows into the reaction zones 343 and 353. The remainder of the staged addition feed stream contacts and intermixes with the process feed stream in the reaction zones 343 and 353, respectively, to form an additional amount of reactant mixture. The reactant mixture comprises $O_2$ and $H_2$. The reactant mixture contacts the catalyst in the reaction zones 343 and 353 and reacts to form a product comprising hydrogen peroxide. The product exits the process microchannels 340 and 350, as indicated by the directional arrows 344 and 354, respectively. The product exiting the process microchannels 340 and 350 flows to the manifold and recuperator 116, and from the manifold and recuperator 116 through the product footer 108 and out of the reactor, as indicated by arrow 122. Heat exchange fluid flows from heat exchange header 110 through heat exchange channels 380 and 390, as indicated by directional arrows 381 and 391, respectively, to heat exchange footer 112. The flow of heat exchange fluid in the direction indicated by arrows 381 and 391 is counter-current to the flow of fluid flowing through process microchannels 340 and 350. Alternatively, the heat exchange channels 380 and 390 could be oriented to provide for the flow of the heat exchange fluid in a direction that would be cocurrent or cross-current to the flow of fluid through the process microchannels 340 and 350. The repeating unit 330 illustrated in FIG. 5 may occur once within the microchannel reactor core 102 or it may be repeated any number of times, for example, two, three, four, five, ten, twenty, fifty, one hundred, hundreds, one thousand, thousands, ten thousand, tens of thousands, one hundred thousand, hundreds of thousands or millions of times.

Figure 6:
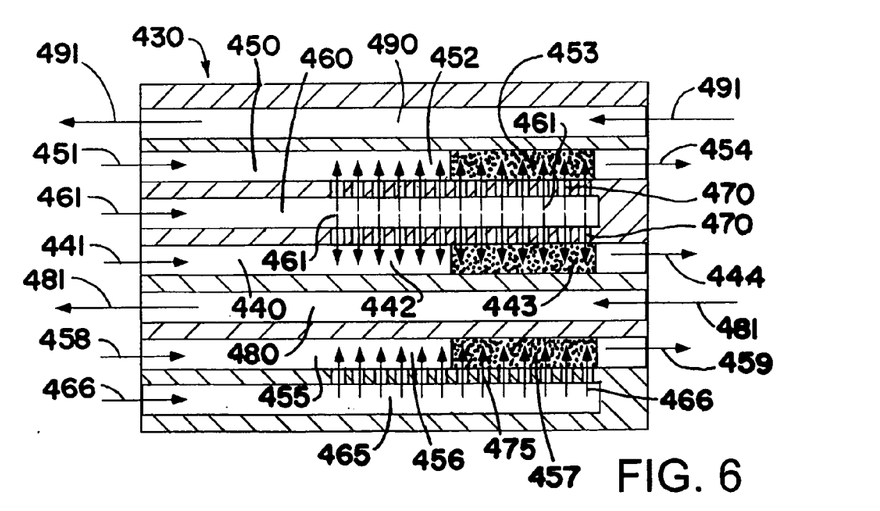
FIG. 6 is a schematic illustration of another repeating unit of process microchannels and heat exchange microchannels that may be used in the microchannel reactor core of the microchannel reactor illustrated in FIG. 2.

FIG. 6 illustrates repeating unit 430 which may be used in the reactor core 102 of the microchannel reactor 100. The inventive process is conducted using process microchannels 440, 450 and 455, staged addition microchannels 460 and 465, orifices 470 and 475, and heat exchange channels 480 and 490. The process microchannels 440, 450, 455 have mixing zones 442, 452 and 456, respectively, and reaction zones 443,453 and 457, respectively. The catalyst is positioned in the reaction zones. The mixing zones are upstream from reaction zones. The process feed stream comprising $O_2$ or $H_2$ flows through process microchannels 440 and 450, as indicated by the directional arrows 441 and 451, respectively. The staged addition feed stream comprising $H_2$ or $O_2$ flows through the staged addition microchannel 460 into and through orifices 470, and from the orifices 470 into process microchannels 440 and 450, s indicated by directional arrows 461. In the process microchannels 440 and 450 a portion of the staged addition feed stream contacts and intermixes with the process feed stream in the mixing zones 442 and 452, respectively. The reactant mixture formed in the mixing zones 442 and 452 flows into the reaction zones 443 and 453, respectively. The remainder of the staged addition feed stream contacts and intermixes with the process feed stream in the reaction zones 443 and 453, respectively, to form an additional amount of reactant mixture. The reactant mixture comprises $O_2$ and $H_2$. In the reaction zones 443 and 453 the reactant mixture contacts the catalyst and reacts to form a product comprising hydrogen peroxide. The process feed stream also flows through process microchannel 455, as indicated by directional arrow 458. The staged addition feed stream also flows through the staged addition microchannel 465 into and through orifices 475, and from orifices 475 into process microchannel 455 as indicated by directional arrows 466. In the process microchannel 455 a portion of the staged addition feed stream contacts and intermixes with the process feed stream in the mixing zone 456 to form a reactant mixture. The reactant mixture formed in the mixing zone 456 flows into the reaction zone 457. The remainder of the staged addition feed stream flowing through the orifices 475 contacts and intermixes with the process feed stream to form a reactant mixture in the reaction zone 457. The reactant mixture comprises $O_2$ and $H_2$. In the reaction zone 457 the reactant mixture contacts the catalyst and reacts to form a product comprising hydrogen peroxide. The product exits the process microchannels 440, 450 and 455 as indicated by the directional arrows 444, 454 and 459, respectively. The product exiting the process microchannels 440, 450 and 455 flows to the manifold and recuperator 116, and from the manifold and recuperator 116 through the product footer 108 and out of the reactor, as indicated by arrow 122. Heat exchange fluid flows from heat exchange header 110 through heat exchange channels 480 and 490, as indicated by directional arrows 481 and 491, respectively, to heat exchange footer 112. The flow of heat exchange fluid in the direction indicated by arrows 481 and 491 is counter-current to the flow of fluid flowing through process microchannels 440, 450 and 455. Alternatively, the heat exchange channels 480 and 490 could be oriented to provide for the flow of the heat exchange fluid in a direction that would be cocurrent or cross-current to the flow of fluid through the process microchannels 440, 450 and 455. The repeating unit 430 illustrated in FIG. 6 may occur once within the microchannel reactor core 102 or it may be repeated any number of times, for example, two, three, four, five, ten, twenty, fifty, one hundred, hundreds, one thousand, thousands, ten thousand, tens of thousands, one hundred thousand, hundreds of thousands or millions of times.

Figure 7:
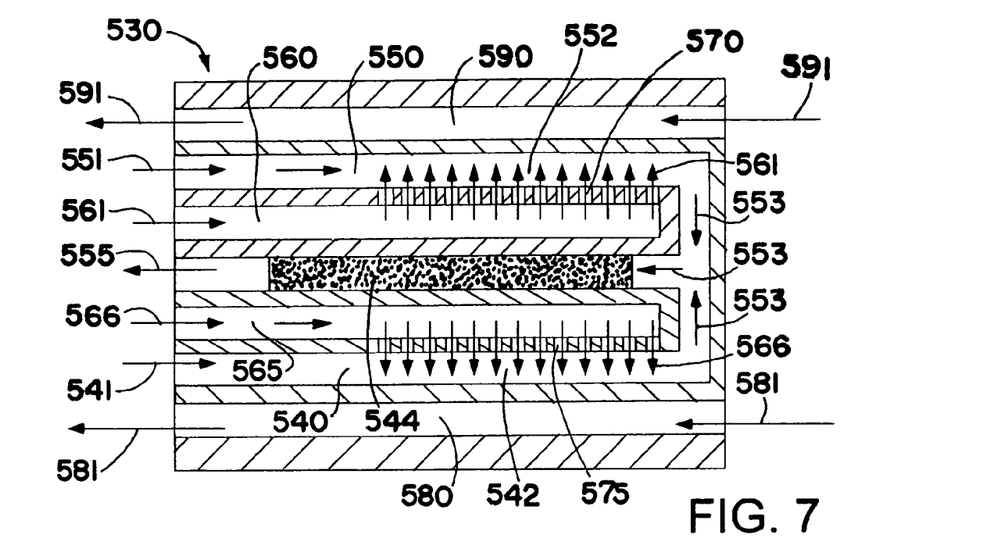
FIG. 7 is a schematic illustration of another repeating unit of process microchannels and heat exchange microchannels that may be used in the microchannel reactor core of the microchannel reactor illustrated in FIG. 2.

FIG. 7 illustrates repeating unit 530 which may be used in the reactor core 102 of the microchannel reactor 100. The inventive process is conducted using process microchannels 540 and 550, staged addition microchannels 560 and 565, orifices 570 and 575, and heat exchange channels 580 and 590. The process microchannels 540 and 550 have mixing zones 542 and 552, respectively, and a common reaction zone 554. The catalyst is positioned in the reaction zone 554. The mixing zones are upstream from the reaction zone. The process feed stream comprising $O_2$ or $H_2$ flows through process microchannels 540 and 550, as indicated by the directional arrows 541 and 551, respectively. The staged addition feed stream comprising $H_2$ or $O_2$ flows through the staged addition microchannels 560 and 565 into orifices 570 and 575, respectively, and from the orifices 570 and 575 into the mixing zones 542 and 552, respectively, as indicated by directional arrows 561 and 566 where it mixes with the process feed stream to form a reactant mixture comprising $H_2$ and $O_2$. The reactant mixture flows into the reaction zone 554, as indicated by arrows 553, contacts the catalyst and reacts to form a product comprising hydrogen peroxide. The product exits reaction zone 554, as indicated by the directional arrow 555. The product exiting the reaction zone 554 flows to the manifold and recuperator 116, and from the manifold and recuperator 116 through the product footer 108 and out of the reactor, as indicated by arrow 122. Heat exchange fluid flows from heat exchange header 110 through heat exchange channels 580 and 590, as indicated by directional arrows 581 and 591 to heat exchange footer 112. The flow of heat exchange fluid in the direction indicated by arrows 581 and 591 is counter-current to the flow of fluid flowing through process microchannels 540 and 550. Alternatively, the heat exchange channels 180 and 190 could be oriented to provide for the flow of the heat exchange fluid in a direction that would be cocurrent or cross-current to the flow of fluid through the process microchannels 540 and 550. The repeating unit 530 illustrated in FIG. 7 may occur once within the microchannel reactor core 102 or it may be repeated any number of times, for example, two, three, four, five, ten, twenty, fifty, one hundred, hundreds, one thousand, thousands, ten thousand, tens of thousands, one hundred thousand, hundreds of thousands or millions of times.

Figure 8:
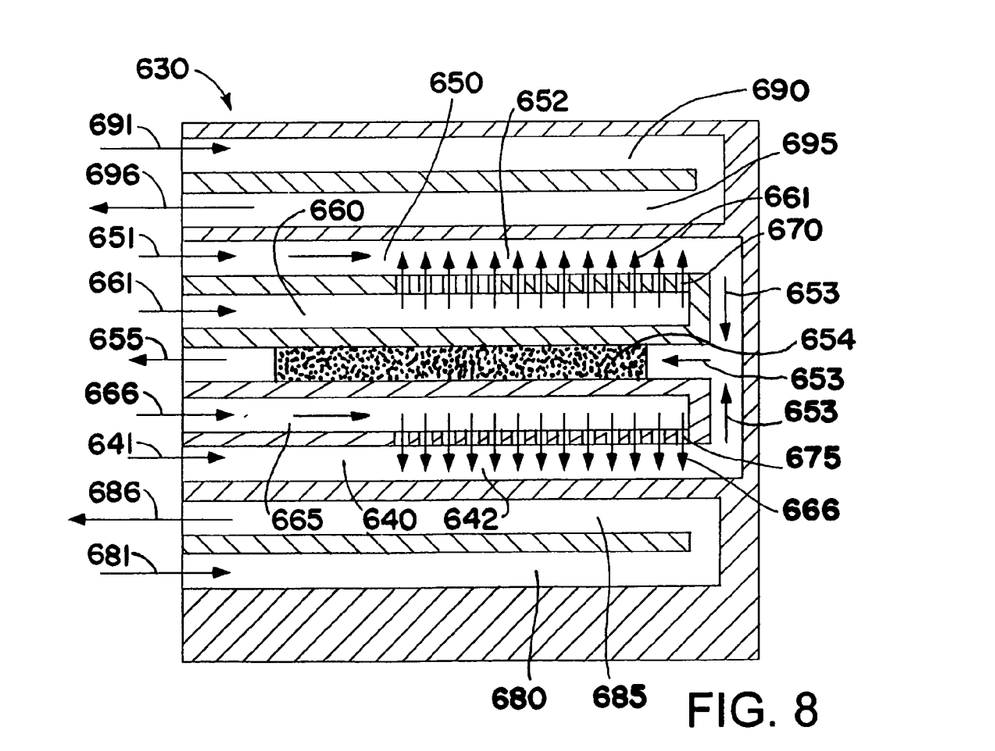
FIG. 8 is a schematic illustration of another repeating unit of process microchannels and heat exchange microchannels that may be used in the microchannel reactor core of the microchannel reactor illustrated in FIG. 2.

FIG. 8 illustrates repeating unit 630 which may be used in the reaction zone 114 of the microchannel reactor 100. The inventive process is conducted using process microchannels 640 and 650, staged addition microchannels 660 and 665, orifices 670 and 675, and heat exchange channels 680, 685, 690 and 695. The process microchannels 640 and 650 have mixing zones 642 and 652, respectively, and a common reaction zone 654. The catalyst is positioned within the reaction zone 654. The mixing zones are upstream from the reaction zone. The process feed stream comprising $O_2$ or $H_2$ flows through process microchannels 640 and 650, as indicated by the directional arrows 641 and 651, respectively. The staged addition feed stream comprising $H_2$ or $O_2$ flows through the staged addition microchannels 660 and 665 into orifices 670 and 675, respectively, and from the orifices 670 and 675 into the mixing zones 642 and 652, respectively, as indicated by directional arrows 661 and 666. In the mixing zones 642 and 652 the staged addition feed stream mixes with the process feed stream to form a reactant mixture comprising $H_2$ and $O_2$. The reactant mixture flows into the reaction zone 654, as indicated by arrows 653, contacts the catalyst and reacts to form a product comprising hydrogen peroxide. The product exits the reaction zone 654, as indicated by directional arrow 655. The product exiting the reaction zone 654 flows to the manifold and recuperator 116, and from the manifold and recuperator 116 through the product footer 108 and out of the reactor, as indicated by arrow 122. Heat exchange fluid flows from heat exchange header 110 through heat exchange channels 680 and 685, and 690 and 695, as indicated by directional arrows 681 and 686, and 691 and 696, respectively, to heat exchange footer 112. The flow of heat exchange fluid in the direction indicated by arrows 681 and 686, and 691 and 696, is cocurrent and counter-current to the flow of fluid flowing through process microchannels 640 and 650. Alternatively, the heat exchange channels 681 and 686, and 691 and 696, could be oriented to provide for the flow of the heat exchange fluid in a direction that would be cross-current to the flow of fluid through the process microchannels 640 and 650. The repeating unit 630 illustrated in FIG. 8 may occur once within the microchannel reactor core 102 or it may be repeated any number of times, for example, two, three, four, five, ten, twenty, fifty, one hundred, hundreds, one thousand, thousands, ten thousand, tens of thousands, one hundred thousand, hundreds of thousands or millions of times.

Figure 9:
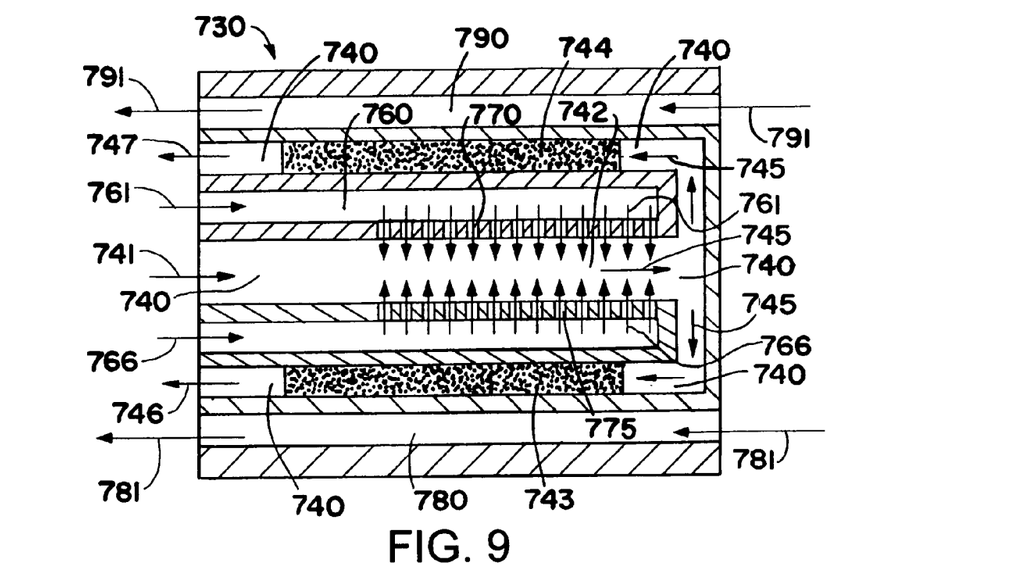
FIG. 9 is a schematic illustration of another repeating unit of process microchannels and heat exchange microchannels that may be used in the microchannel reactor core of the microchannel reactor illustrated in FIG. 2.

FIG. 9 illustrates repeating unit 730 which may be used in the reactor core 102 of the microchannel reactor 100. The inventive process is conducted using process microchannel 740, staged addition microchannels 760 and 765, orifices 770 and 775, and heat exchange channels 780 and 790. The process microchannel 740 has mixing zone 742 and reaction zones 743 and 744. The catalyst is positioned in the reaction zones 743 and 744. The mixing zone 742 is upstream from the reaction zones. The process feed stream comprising $O_2$ or $H_2$ flows through process microchannel 740, as indicated by the directional arrow 741. The staged addition feed stream comprising $H_2$ or $O_2$ flows through the staged addition microchannels 760 and 766 into orifices 770 and 775, respectively, and from the orifices 770 and 775 into the mixing zone 742, as indicated by directional arrows 761 and 766. In the mixing zone 742 the staged addition feed stream is mixed with the process feed stream to form a reactant mixture comprising $H_2$ and $O_2$. The reactant mixture flows into the reaction zones 743 and 744, as indicated by arrows 745, contacts the catalyst and reacts to form a product comprising hydrogen peroxide. The product exits reaction zones 743 and 744, as indicated by the directional arrows 746 and 747, respectively. The product exiting the reaction zone 743 and 744, flows to the manifold and recuperator 116, and from the manifold and recuperator 116 through the product footer 108 and out of the reactor, as indicated by arrow 122. Heat exchange fluid flows from heat exchange header 110 through heat exchange channels 780 and 790, as indicated by directional arrows 781 and 791, to heat exchange footer 112. The flow of heat exchange fluid in the direction indicated by arrows 781 and 791 is co-current to the flow of fluid flowing through the reaction zones 743 and 744. Alternatively, the heat exchange channels 780 and 790 could be oriented to provide for the flow of the heat exchange fluid in a direction that would be counter-current or cross-current to the flow of fluid through the reaction zones 743 and 744. The repeating unit 730 illustrated in FIG. 9 may occur once within the microchannel reactor core 102 or it may be repeated any number of times, for example, two, three, four, five, ten, twenty, fifty, one hundred, hundreds, one thousand, thousands, ten thousand, tens of thousands, one hundred thousand, hundreds of thousands or millions of times.

Figure 10:
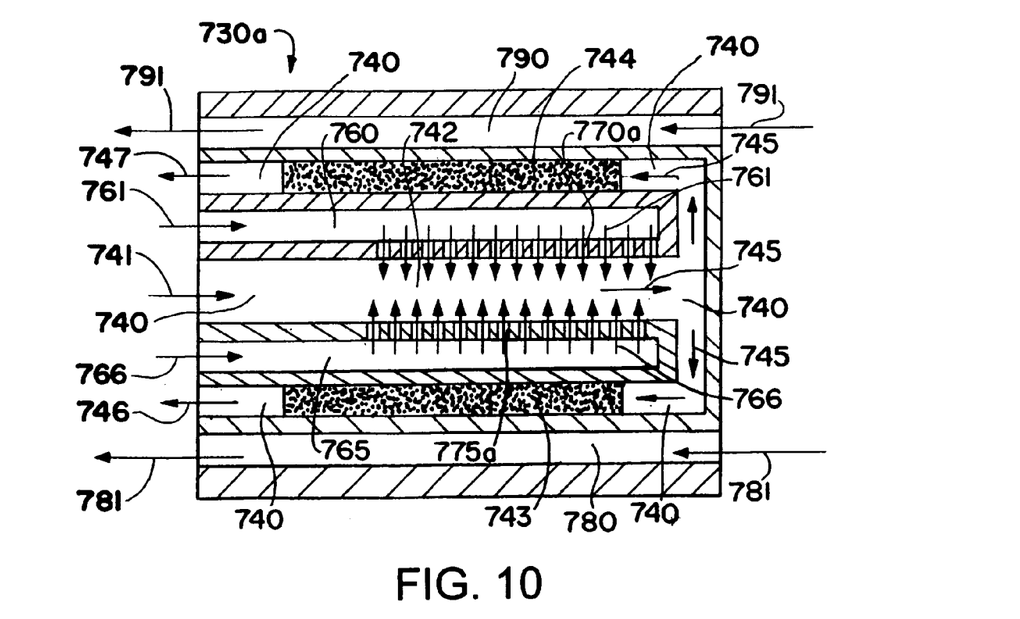
FIG. 10 is a schematic illustration of another repeating unit of process microchannels and heat exchange microchannels that may be used in the microchannel reactor core of the microchannel reactor illustrated in FIG. 2.

The repeating unit 730a illustrated in FIG. 10 is identical to the repeating unit 730 illustrated in FIG. 9 with the exception that the orifices 770 and 775 illustrated in FIG. 9 are aligned directly opposite each other, while the orifices 770a and 775a illustrated in FIG. 10 are offset from such direct alignment. In FIG. 9 the staged addition feed streams flowing through the orifices 770 and 775 impinge directly on one another thereby enhancing the diffusion of such streams in the mixing zone 742. On the other hand, in FIG. 10 the staged addition feed streams flowing through the orifices 770a and 775a alternate in sequence to reduce the diffusional distance between the centerlines of the process feed stream and the staged addition feed steam.

The contacting time for post orifice mixing may be defined, for example, with reference to FIG. 9 or 10, using the sum of the total of the flow through the orifices 770 and 775 (or 770a and 775a) and the flow of the process feed stream in process microchannel 740, as indicated by arrow 741, at standard conditions of temperature (i.e., 20° C.) and pressure (i.e., atmospheric pressure), and the volume defined by the process microchannel 740 between the tangent of the last orifices 770 and 775 (or 770a and 775a) (downstream of the flow of the process feed stream) and the beginning of the catalysts in the reaction zones 743 and 744. This contacting time may range of about 0.25 ms to about 500 ms, and in one embodiment from about 0.25 ms to about 250 ms, and in one embodiment from about 0.25 to about 50 ms, and in one embodiment from about 0.25 to about 2.5 ms.

Each of the process microchannels and staged addition microchannels may have at least one internal dimension of height or width of up to about 10 mm, and in one embodiment from about 0.05 to about 10 mm, and in one embodiment about 0.05 to about 5 mm, and in one embodiment about 0.05 to about 2 mm, and in one embodiment about 0.05 to about 1.5 mm, and in one embodiment about 0.05 to about 1 mm, and in one embodiment about 0.05 to about 0.5 mm. The height or width may range from about 0.15 to about 10 mm, and in one embodiment from about 0.2 to about 10 mm, and in one embodiment from about 0.3 to about 10 mm. The height or width may range from about 0.2 to about 5 mm, and in one embodiment from about 0.2 to about 3 mm, and in one embodiment from about 0.3 to about 2 mm. The other internal dimension of height or width may be of any value, for example, it may range up to about 100 cm, and in one embodiment from about 0.01 to about 100 cm, and in one embodiment from about 0.1 cm to about 100 cm, and in one embodiment from about 0.1 to about 75 cm, and in one embodiment from about 0.1 to about 50 cm, and in one embodiment about 0.2 cm to about 25 cm. The length of each of the process microchannels and the staged addition microchannels may be of any value, for example, the lengths may range up to about 10 m, and in one embodiment from about 1 cm to about 10 m, and in one embodiment from about 1 cm to about 5 m, and in one embodiment 1 cm to about 2.5 m, and in one embodiment from about 1 cm to about 1 m, and in one embodiment from about 2 cm to about 50 cm, and in one embodiment about 2 to about 25 cm.

Each of the heat exchange channels may have at least one internal dimension of height or width of up to about 10 mm, and in one embodiment about 0.05 to about 10 mm, and in one embodiment about 0.05 to about 5 mm, and in one embodiment from about 0.05 to about 2 mm, and in one embodiment from about 0.5 to about 1 mm. The length or width may range from about 0.15 to about 10 mm, and in one embodiment from about 0.2 to about 10 mm, and in one embodiment from about 0.3 to about 10 mm. The height or width may range from about 0.2 to about 5 mm, and in one embodiment from about 0.2 to about 3 mm, and in one embodiment from about 0.3 to about 2 mm. The other internal dimension or height or width may range up to about 100 cm, and in one embodiment from about 0.01 to about 100 cm, and in one embodiment from about 0.1 cm to about 100 cm, and in one embodiment about 0.1 cm to about 50 cm, and in one embodiment about 0.2 cm to about 10 cm. The lengths of the heat exchange channels may be of any value, for example, the lengths may range up to about 10 m, and in one embodiment from about 1 cm to about 10 m, and in one embodiment from about 1 cm to about 5 m, and in one embodiment about 1 cm to about 2.5 m, and in one embodiment from about 1 cm to about 1 m, and in one embodiment from about 1 to about 50 cm, and in one embodiment from about 1 to about 25 cm. These heat exchange channels may be microchannels. The separation between the process microchannels and/or staged addition microchannels and the next adjacent heat exchange channel may range from about 0.05 mm to about 5 mm, and in one embodiment about 0.2 mm to about 2 mm.

The microchannel reactor may be constructed of any material that provides sufficient strength, dimensional stability and heat transfer characteristics for carrying out the inventive process. Examples of suitable materials include steel (e.g., stainless steel, carbon steel, and the like), aluminum, titanium, nickel, and alloys of any of the foregoing metals, plastics (e.g., epoxy resins, UV cured resins, thermosetting resins, and the like), monel, inconel, ceramics, glass, composites, quartz, silicon, or a combination of two or more thereof. The microchannel reactor may be fabricated using known techniques including wire electrodischarge machining, conventional machining, laser cutting, photochemical machining, electrochemical machining, molding, water jet, stamping, etching (for example, chemical, photochemical or plasma etching) and combinations thereof. The microchannel reactor may be constructed by forming layers or sheets with portions removed that allow flow passage. A stack of sheets may be assembled via diffusion bonding, laser welding, diffusion brazing, and similar methods to form an integrated device. Stacks of sheets may be gasketed together to form an integral device. The microchannel reactor has appropriate manifolds, valves, conduit lines, etc. to control flow of the reactant composition and product, and flow of the heat exchange fluid. These are not shown in the drawings, but can be readily provided by those skilled in the art.

The process feed stream entering the process microchannels may comprise $O_2$, $H_2$, or a mixture thereof. The concentration of $O_2$ may range from about 1 to about 99% by volume, and in one embodiment about 20 to about 70% by volume. The concentration of $H_2$ may range from about 1 to about 99% by volume, and in one embodiment about 20 to about 70% by volume. The process feed stream may further comprise water, methane, carbon monoxide, carbon dioxide or nitrogen.

The staged addition feed stream entering the staged addition microchannels may comprise $O_2$ or $H_2$. The concentration of $O_2$ or $H_2$ may range from about 1 to about 100% by volume, and in one embodiment about 50 to about 100% by volume. The staged addition feed stream may further comprise water, methane, carbon dioxide, carbon monoxide or nitrogen.

The total molar ratio of $H_2$ to $O_2$ in the process feed stream and staged addition feed stream entering the process microchannels may range from about 0.1 to about 10, and in one embodiment about 0.5 to about 2.

The $H_2$ in the process feed stream and/or the staged addition feed stream may be derived from another process such as a steam reforming process (product stream with $H_2/CO$ mole ratio of about 3), a partial oxidation process (product stream with $H_2/CO$ mole ration of about 2), an autothermal reforming process (product stream with $H_2/CO$ mole ratio of about 2.5), a $CO_2$ reforming process (product stream with $H_2/CO$ mole ratio of about 1), a coal gassification process (product stream with $H_2/CO$ mole ratio of about 1), and combinations thereof. With each of these feed streams the $H_2$ may be separated from the remaining ingredients using conventional techniques such as membranes or adsorption.

The $O_2$ in the process feed stream and/or the staged addition feed stream may be pure oxygen or it may be derived from air or nitrous oxides. The $O_2$ may be separated using conventional techniques such as cryogenic distillation, membranes, and adsorption.

The presence of contaminants such as sulfur, nitrogen, halogen, selenium, phosphorus, arsenic, and the like, in the process feed stream and/or the staged addition feed stream may be undesirable. Thus, in one embodiment of the invention, the foregoing contaminants may be removed from the process feed stream and/or the staged addition feed stream or have their concentrations reduced prior to conducting the inventive process. Techniques for removing these contaminants are well known to those of skill in the art. For example, ZnO guardbeds may be used for removing sulfur impurities. In one embodiment, the contaminant level in the process feed stream and/or the staged addition feed stream may be at a level of up to about 10% by volume, and in one embodiment up to about 5% by volume, and in one embodiment up to about 2% by volume, and in one embodiment up to about 1% by volume, and in one embodiment up to about 0.1% by volume, and in one embodiment up to about 0.01% by volume.

The heat exchange fluid may be any fluid. These include air, steam, liquid water, gaseous nitrogen, liquid nitrogen, other gases including inert gases, carbon monoxide, molten salt, oils such as mineral oil, and heat exchange fluids such as Dowtherm A and Therminol which are available from Dow-Union Carbide.

The heat exchange fluid may comprise a stream of the reactant composition. This can provide process pre-heat and increase in overall thermal efficiency of the process.

In one embodiment, the heat exchange channels comprise process channels wherein an endothermic process is conducted. These heat exchange process channels may be microchannels. Examples of endothermic processes that may be conducted in the heat exchange channels include steam reforming and dehydrogenation reactions. In one embodiment, the incorporation of a simultaneous endothermic reaction to provide an improved heat sink may enable a typical heat flux of roughly an order of magnitude or more above the convective cooling heat flux. The use of simultaneous exothermic and endothermic reactions to exchange heat in a microchannel reactor is disclosed in U.S. patent application Ser. No. 10/222,196, filed Aug. 15, 2002, which is incorporated herein by reference.

In one embodiment, the heat exchange fluid undergoes a phase change as it flows through the heat exchange channels. This phase change provides additional heat removal from the process microchannels beyond that provided by convective cooling. For a liquid heat exchange fluid being vaporized, the additional heat being transferred from the process microchannels would result from the latent heat of vaporization required by the heat exchange fluid. An example of such a phase change would be an oil or water that undergoes partial or complete boiling. In one embodiment, the percent boiling of the phase change fluid may be up to about 50%.

The heat flux for convective heat exchange or convective cooling in the microchannel reactor may range from about 1 to about 25 watts per square centimeter of surface area of the one or more process microchannels ($W/cm^2$) in the microchannel reactor. The heat flux for phase change heat exchange may range from about 1 to about 250 $W/cm^2$, and in one embodiment, from about 1 to about 100 $W/cm^2$, and in one embodiment from about 1 to about 50 $W/cm^2$, and in one embodiment from about 1 to about 25 $W/cm^2$, and in one embodiment from about 1 to about 10 $W/cm^2$.

The cooling of the process microchannels during the inventive process, in one embodiment, is advantageous for reducing the possibility of explosions and/or detonations due to the use of $O_2$ and $H_2$. As a result of this cooling, in one embodiment, the temperature of the process feed stream at the entrance to the process microchannels may be within about 200° C., and in one embodiment within about 100° C., and in one embodiment within about 50° C., and in one embodiment within about 20° C., of the temperature of the product exiting the process microchannels.

The catalyst may comprise any catalyst suitable for the direct production of hydrogen peroxide from $O_2$ and $H_2$. The catalyst may comprise at least one catalytically active metal or oxide thereof. The catalyst may comprise a metal from Group VIII of the Periodic Table, or an oxide thereof, or a mixture of two or more thereof. The catalyst may comprise Co, Fe, Ni, Ru, Rh, Pd, Ir, Pt, Os, or an oxide thereof, or a combination of two or more thereof. In one embodiment, the catalyst further comprises a catalyst support. The support material may comprise a ceramic, alumina, zirconia, silica, aluminum fluoride, bentonite, ceria, zinc oxide, silica-alumina, silicon carbide, a refractory oxide, molecular sieves, diatomaceous earth, or a combination of two or more thereof. Examples of catalysts that may be used include those disclosed in U.S. Pat. Nos. 3,336,112; 4,009,252; 4,389,390; 4,681,751; 4,772,458; 4,832,938; 4,889,705; 5,104,635; 5,135,731; and 6,576,214 B2; these patents being incorporated herein by reference for their disclosures of catalysts suitable for the production of hydrogen peroxide from oxygen and hydrogen, and methods for preparing such catalysts.

The catalyst used in a microchannel reactor may have any size and geometric configuration that fits within the process microchannels. The catalyst may be in the form of particulate solids (e.g., pellets, powder, fibers, and the like) having a median particle diameter of about 1 to about 1000 μm, and in one embodiment about 10 to about 500 μm, and in one embodiment about 25 to about 250 μm. In one embodiment, the catalyst is in the form of a fixed bed of particulate solids.

In one embodiment, the catalyst is in the form of a fixed bed of particulate solids, the median particle diameter of the catalyst particulate solids is relatively small, and the length of each process microchannel is relatively short. The median particle diameter may be in the range of about 1 to about 1000 μm, and in one embodiment about 1 to about 500 μm, and the length of each process microchannel may be in the range of up to about 10 meters, and in one embodiment about 1 cm to about 10 meters, and in one embodiment about 1 cm to about 5 meters, and in one embodiment about 1 cm to about 2 meters, and in one embodiment about 1 cm to about 1 meter, and in one embodiment about 1 to about 25 cm.

The catalyst may be supported on a porous support structure such as a foam, felt, wad or a combination thereof. The term "foam" is used herein to refer to a structure with continuous walls defining pores throughout the structure. The term "felt" is used herein to refer to a structure of fibers with interstitial spaces therebetween. The term "wad" is used herein to refer to a support having a structure of tangled strands, like steel wool. The catalyst may be supported on a support having a honeycomb structure or a serpentine configuration.

Figure 11:
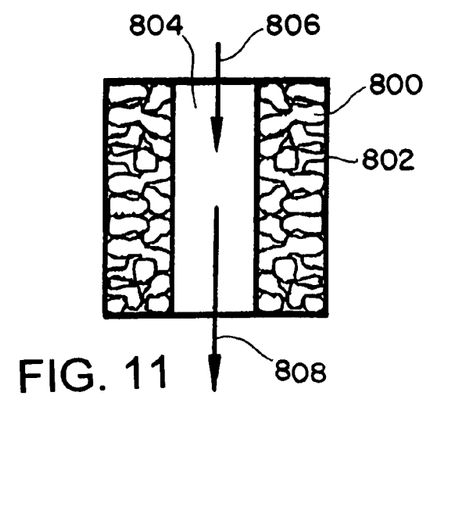
FIG. 11 is a schematic illustration of a process microchannel that may be used with the inventive process, the process microchannel containing a catalyst having a flow-by configuration.

The catalyst may be supported on a flow-by support structure such as a felt with an adjacent gap, a foam with an adjacent gap, a fin structure with gaps, a washcoat on any inserted substrate, or a gauze that is parallel to the flow direction with a corresponding gap for flow. An example of a flow-by structure is illustrated in FIG. 11. In FIG. 11 the catalyst 800 is contained within process microchannel 802. An open passage way 804 permits the flow of the reactants through the process microchannel 802 in contact with the catalyst 800 as indicated by arrows 806 and 808.

Figure 12:
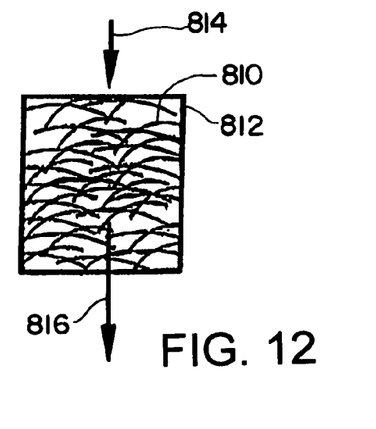
FIG. 12 is a schematic illustration of a process microchannel that may be used with the inventive process, the process microchannel containing a catalyst having a flow-through configuration.

The catalyst may be supported on a flow-through support structure such as a foam, wad, pellet, powder, or gauze. An example of a flow-through structure is illustrated in FIG. 12. In FIG. 12, the flow-through catalyst 810 is contained within process microchannel 812 and the reactants flow through the catalyst 810 as indicated by arrows 814 and 816.

The support may be formed from a material comprising silica gel, foamed copper, sintered stainless steel fiber, steel wool, alumina, poly(methyl methacrylate), polysulfonate, poly(tetrafluoroethylene), iron, nickel sponge, nylon, polyvinylidene difluoride, polypropylene, polyethylene, polyethylene ethylketone, polyvinyl alcohol, polyvinyl acetate, polyacrylate, polymethylmethacrylate, polystyrene, polyphenylene sulfide, polysulfone, polybutylene, or a combination of two or more thereof. In one embodiment, the support structure may be made of a heat conducting material, such as a metal, to enhance the transfer of heat away from the catalyst.

The catalyst may be directly washcoated on the interior walls of the process microchannels, grown on the walls from solution, or coated in situ on a fin structure. The catalyst may be in the form of a single piece of porous contiguous material, or many pieces in physical contact. In one embodiment, the catalyst may be comprised of a contiguous material and has a contiguous porosity such that molecules can diffuse through the catalyst. In this embodiment, the fluids flow through the catalyst rather than around it. In one embodiment, the cross-sectional area of the catalyst occupies about 1 to about 99%, and in one embodiment about 10 to about 95% of the cross-sectional area of the process microchannels. The catalyst may have a surface area, as measured by BET, of greater than about 0.5 $m^2/g$, and in one embodiment greater than about 2 $m^2/g$, and in one embodiment greater than about 5 $m^2/g$, and in one embodiment greater than about 10 $m^2/g$, and in one embodiment greater than about 25 $m^2/g$, and in one embodiment greater than about 50 $m^2/g$.

The catalyst may comprise a porous support, an interfacial layer overlying the porous support, and a catalyst material dispersed or deposited on the interfacial layer. The interfacial layer may be solution deposited on the support or it may be deposited by chemical vapor deposition or physical vapor deposition. In one embodiment the catalyst comprises a porous support, optionally a buffer layer overlying the support, an interfacial layer overlying the support or the optional buffer layer, and a catalyst material dispersed or deposited on the interfacial layer. Any of the foregoing layers may be continuous or discontinuous as in the form of spots or dots, or in the form of a layer with gaps or holes.

The porous support may have a porosity of at least about 5% as measured by mercury porosimetry and an average pore size (sum of pore diameters divided by number of pores) of about 1 to about 1000 μm. The porous support may be made of any of the above indicated materials identified as being useful in making a support structure. The porous support may comprise a porous ceramic support or a metal foam. Other porous supports that may be used include carbides, nitrides, and composite materials. The porous support may have a porosity of about 30% to about 99%, and in one embodiment about 60% to about 98%. The porous support may be in the form of a foam, felt, wad, or a combination thereof. The open cells of the metal foam may range from about 20 pores per inch (ppi) to about 3000 ppi, and in one embodiment about 20 to about 1000 ppi, and in one embodiment about 40 to about 120 ppi. The term "ppi" refers to the largest number of pores per inch (in isotropic materials the direction of the measurement is irrelevant; however, in anisotropic materials, the measurement is done in the direction that maximizes pore number).

The buffer layer, when present, may have a different composition and/or density than both the porous support and the interfacial layers, and in one embodiment has a coefficient of thermal expansion that is intermediate the thermal expansion coefficients of the porous support and the interfacial layer. The buffer layer may be a metal oxide or metal carbide. The buffer layer may be comprised of $Al_2O_3$, $TiO_2$, $SiO_2$, $ZrO_2$, or combination thereof. The $Al_2O_3$ may be $\alpha$-$Al_2O_3$, $\gamma$-$Al_2O_3$ or a combination thereof. $\alpha$-$Al_2O_3$ provides the advantage of excellent resistance to oxygen diffusion. The buffer layer may be formed of two or more compositionally different sublayers. For example, when the porous support is metal, for example a stainless steel foam, a buffer layer formed of two compositionally different sub-layers may be used. The first sublayer (in contact with the porous support) may be $TiO_2$. The second sublayer may be $\alpha$-$Al_2O_3$ which is placed upon the $TiO_2$. In one embodiment, the $\alpha$-$Al_2O_3$ sublayer is a dense layer that provides protection of the underlying metal surface. A less dense, high surface area interfacial layer such as alumina may then be deposited as support for a catalytically active layer.

The porous support may have a thermal coefficient of expansion different from that of the interfacial layer. In such a case a buffer layer may be needed to transition between the two coefficients of thermal expansion. The thermal expansion coefficient of the buffer layer can be tailored by controlling its composition to obtain an expansion coefficient that is compatible with the expansion coefficients of the porous support and interfacial layers. The buffer layer should be free of openings and pin holes to provide superior protection of the underlying support. The buffer layer may be nonporous. The buffer layer may have a thickness that is less than one half of the average pore size of the porous support. The buffer layer may have a thickness of about 0.05 to about 10 μm, and in one embodiment about 0.05 to about 5 μm.

In one embodiment of the invention, adequate adhesion and chemical stability may be obtained without a buffer layer. In this embodiment the buffer layer may be omitted.

The interfacial layer may comprise nitrides, carbides, sulfides, halides, metal oxides, carbon, or a combination thereof. The interfacial layer provides high surface area and/or provides a desirable catalyst-support interaction for supported catalysts. The interfacial layer may be comprised of any material that is conventionally used as a catalyst support. The interfacial layer may be comprised of a metal oxide. Examples of metal oxides that may be used include $\gamma$-$Al_2O_3$, $SiO_2$, $ZrO_2$, $TiO_2$, tungsten oxide, magnesium oxide, vanadium oxide, chromium oxide, manganese oxide, iron oxide, nickel oxide, cobalt oxide, copper oxide, zinc oxide, molybdenum oxide, tin oxide, calcium oxide, aluminum oxide, lanthanum series oxide(s), zeolite(s) and combinations thereof. The interfacial layer may serve as a catalytically active layer without any further catalytically active material deposited thereon. Usually, however, the interfacial layer is used in combination with a catalytically active layer. The interfacial layer may also be formed of two or more compositionally different sublayers. The interfacial layer may have a thickness that is less than one half of the average pore size of the porous support. The interfacial layer thickness may range from about 0.5 to about 100 μm, and in one embodiment from about 1 to about 50 μm. The interfacial layer may be either crystalline or amorphous. The interfacial layer may have a BET surface area of at least about 1 $m^2/g$.

The catalyst may be deposited on the interfacial layer. Alternatively, the catalyst material may be simultaneously deposited with the interfacial layer. The catalyst layer may be intimately dispersed on the interfacial layer. That the catalyst layer is "dispersed on" or "deposited on" the interfacial layer includes the conventional understanding that microscopic catalyst particles are dispersed: on the support layer (i. e., interfacial layer) surface, in crevices in the support layer, and in open pores in the support layer.

Figure 13:
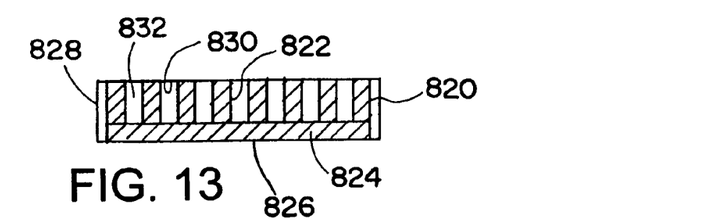
FIG. 13 is a schematic illustration of a process microchannel that may be used in the inventive process, the process microchannel containing a fin assembly comprising a plurality of fins, a catalyst being supported by the fins.
Figure 14:
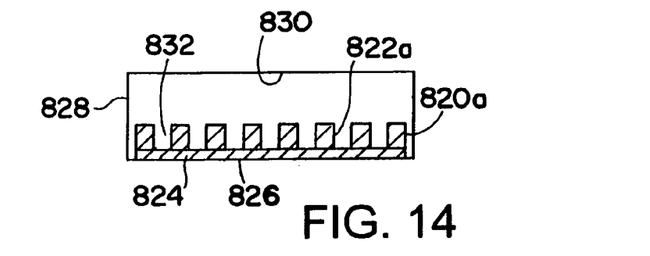
FIG. 14 illustrates an alternate embodiment of the process microchannel and fin assembly illustrated in FIG. 13.
Figure 15:
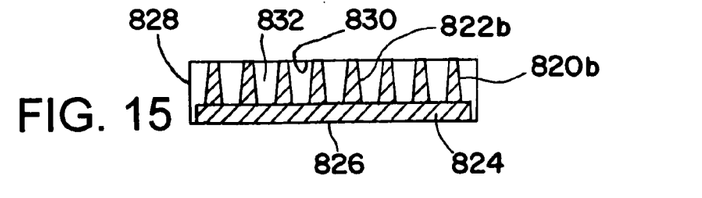
FIG. 15 illustrates another alternate embodiment of the process microchannel and fin assembly illustrated in FIG. 13.

The catalyst may be supported on an assembly of one or more fins positioned within the process microchannels. Examples are illustrated in FIGS. 13–15. Referring to FIG. 13, fin assembly 820 includes fins 822 which are mounted on fin support 824 which overlies base wall 826 of process microchannel 828. The fins 822 project from the fin support 824 into the interior of the process microchannel 828. The fins 822 extend to and contact the interior surface of upper wall 830 of process microchannel 828. Fin channels 832 between the fins 822 provide passage ways for fluid to flow through the process microchannel 828 parallel to its length. Each of the fins 822 has an exterior surface on each of its sides, this exterior surface provides a support base for the catalyst. With the inventive process, the reactants flow through the fin channels 832, contact the catalyst supported on the exterior surface of the fins 822, and react to form the product. The fin assembly 820a illustrated in FIG. 14 is similar to the fin assembly 820 illustrated in FIG. 13 except that the fins 822a do not extend all the way to the interior surface of the upper wall 830 of the microchannel 828. The fin assembly 820b illustrated in FIG. 15 is similar to the fin assembly 820 illustrated in FIG. 13 except that the fins 822b in the fin assembly 820b have cross sectional shapes in the form of trapezoids. Each of the fins may have a height ranging from about 0.02 mm up to the height of the process microchannel 828, and in one embodiment from about 0.02 to about 10 mm, and in one embodiment from about 0.02 to about 5 mm, and in one embodiment from about 0.02 to about 2 mm. The width of each fin may range from about 0.02 to about 5 mm, and in one embodiment from about 0.02 to about 2 mm and in one embodiment about 0.02 to about 1 mm. The length of each fin may be of any length up to the length of the process microchannel 828, and in one embodiment up to about 10 m, and in one embodiment about 0.5 to about 10 m, and in one embodiment about 0.5 to about 6 m, and in one embodiment about 0.5 to about 3 m. The gap between each of the fins may be of any value and may range from about 0.02 to about 5 mm, and in one embodiment from about 0.02 to about 2 mm, and in one embodiment from about 0.02 to about 1 mm. The number of fins in the process microchannel 828 may range from about 1 to about 50 fins per centimeter of width of the process microchannel 828, and in one embodiment from about 1 to about 30 fins per centimeter, and in one embodiment from about 1 to about 10 fins per centimeter, and in one embodiment from about 1 to about 5 fins per centimeter, and in one embodiment from about 1 to about 3 fins per centimeter. Each of the fins may have a cross-section in the form of a rectangle or square as illustrated in FIG. 13 or 14, or a trapezoid as illustrated in FIG. 15. When viewed along its length, each fin may be straight, tapered or have a serpentine configuration. The fin assembly may be made of any material that provides sufficient strength, dimensional stability and heat transfer characteristics to permit operation for which the process microchannel is intended. These materials include: steel (e.g., stainless steel, carbon steel, and the like); monel; inconel; aluminum; titanium; nickel; platinum; rhodium; copper; chromium; brass; alloys of any of the foregoing metals; polymers (e.g., thermoset resins); ceramics; glass; composites comprising one or more polymers (e.g., thermoset resins) and fiberglass; quartz; silicon; or a combination of two or more thereof. The fin assembly may be made of an $Al_2O_3$ forming material such as an alloy comprising Fe, Cr, Al and Y, or a $Cr_2O_3$ forming material such as an alloy of Ni, Cr and Fe.

In one embodiment, the catalyst may be regenerated. This may be done by flowing a regenerating fluid through the process microchannels in contact with the catalyst. The regenerating fluid may comprise hydrogen or a diluted hydrogen stream. The diluent may comprise nitrogen, argon, steam, methane, carbon dioxide, or a mixture of two or more thereof. The concentration of $H_2$ in the regenerating fluid may range up to about 100% by volume, and in one embodiment from about 1 to about 100% by volume, and in one embodiment about 1 to about 50% volume. The regenerating fluid may flow from the header 104 through the process microchannels to the footer 106, or in the opposite direction from the footer 106 through the process microchannels to the header 104. The temperature of the regenerating fluid may be from about 20 to about 600° C., and in one embodiment about 20 to about 400° C., and in one embodiment about 80 to about 200° C. The pressure within the process microchannels during this regeneration step may range from about 1 to about 100 atmospheres, and in one embodiment about 1 to about 10 atmospheres. The residence time for the regenerating fluid in the process microchannels may range from about 0.001 to about 10 seconds, and in one embodiment about 0.01 second to about 1 second. In one embodiment, the reaction zones in the process microchannels may be characterized by having a bulk flow path. The term "bulk flow path" refers to an open path (contiguous bulk flow region) within the process microchannels. A contiguous bulk flow region allows rapid fluid flow through the microchannels without large pressure drops. In one embodiment, the flow of fluid in the bulk flow region is laminar. Bulk flow regions within each process microchannel may have a cross-sectional area of about 0.05 to about 10,000 $mm^2$, and in one embodiment about 0.05 to about 5000 $mm^2$, and in one embodiment about 0.1 to about 2500 $mm^2$. The bulk flow regions may comprise from about 5% to about 95%, and in one embodiment about 30% to about 80% of the cross-section of the process microchannels.

The product comprises hydrogen peroxide. In one embodiment, the product may further comprise water, methane, carbon monoxide, carbon dioxide, nitrogen, or a mixture of two or more thereof. The concentration of hydrogen peroxide in the product may range up to about 100% by weight, and in one embodiment from about 1% to about 100% by weight, and in one embodiment from about 5% to about 100% by weight, and in one embodiment from about 10 to about 90% by weight, and in one embodiment from about 30% to about 90% by weight and in one embodiment about 50 to about 90% by weight. In one embodiment, the product comprises hydrogen peroxide and water, the concentration of hydrogen peroxide being from about 1% to about 70% by weight, and in one embodiment about 5 to about 50% by weight, and in one embodiment about 10 to about 30% by weight.

The contact time of the reactants with the catalyst within the process microchannels may range up to about 500 milliseconds (ms), and in one embodiment from about 1 ms to about 250 ms, and in one embodiment about 10 ms to about 100 ms.

The space velocity (or gas hourly space velocity (GHSV)) for the flow of the reactants and product through the process microchannels may be at least about 10000 $hr^{-1}$ (normal liters of feed/hour/liter of volume within the process microchannels) or at least about 9260 ml feed/(g catalyst) (hr). The space velocity may range from about 10,000 to about 1,000,000 $hr^{-1}$, or from about 9260 to about 926,000 ml feed/(g catalyst) (hr). In one embodiment, the space velocity may range from about 100,000 to about 1,000,000 $hr^{-1}$, or about 92,600 to about 926,000 ml feed/(g catalyst) (hr).

The temperature of the reactants entering the process microchannels may range from about 20° C. to about 200° C., and in one embodiment about 20° C. to about 100° C., and in one embodiment about 20° C. to about 50° C.

The temperature within the process microchannels may range from about 50° C. to about 400° C., and in one embodiment from about 50° C. to about 200° C., and in one embodiment from about 100° C. to about 200° C.

The temperature of the product exiting the process microchannels may range from about 50° C. to about 400° C., and in one embodiment about 50° C. to about 200° C., and in one embodiment about 100° C. to about 200° C.

The pressure within the process microchannels may be up to about 100 atmospheres, and in one embodiment up to about 10 atmospheres, and in one embodiment up to about 5 atmospheres, In one embodiment the pressure may range from about 1 to about 10 atmospheres, and in one embodiment from about 1 to about 5 atmospheres, and in one embodiment from about 1 to about 3 atmospheres.

The pressure drop of the reactants and/or products as they flow through the process microchannels may range up to about 100 atmospheres per meter of length of the process microchannel (atm/m), and in one embodiment up to about 10 atm/m, and in one embodiment up to about 5 atm/m.

The reactants entering the process microchannels are typically in the form of a vapor, while the product exiting the process microchannels may be in the form of a vapor, a liquid, or a mixture of vapor and liquid. The Reynolds Number for the flow of vapor through the process microchannels may be in the range of about 10 to about 4000, and in one embodiment about 100 to about 2000. The Reynolds Number for the flow of liquid through the process microchannels may be about 10 to about 4000, and in one embodiment about 100 to about 2000.

The heat exchange fluid entering the heat exchange channels may be at a temperature of about 20° C. to about 200° C., and in one embodiment about 20° C. to about 100° C. The heat exchange fluid exiting the heat exchange channels may be at a temperature in the range of about 50° C. to about 400° C., and in one embodiment about 100° C. to about 200° C. The residence time of the heat exchange fluid in the heat exchange channels may range from about 1 to about 1000 ms, and in one embodiment about 10 to about 500 ms. The pressure drop for the heat exchange fluid as it flows through the heat exchange channels may range up to about 100 atm/m, and in one embodiment up to about 10 to atm/m, and in one embodiment up to about 5 atm/m, and in one embodiment from about 1 to about 5 atm/m. The heat exchange fluid may be in the form of a vapor, a liquid, or a mixture of vapor and liquid. The Reynolds Number for the flow of vapor through the heat exchange channels may be from about 10 to about 4000, and in one embodiment about 100 to about 2000. The Reynolds Number for the flow of liquid through heat exchange channels may be from about 10 to about 4000, and in one embodiment about 100 to about 2000.

The conversion of $O_2$ may be about 10% or higher per cycle, and in one embodiment about 30% or higher, and in one embodiment about 50% or higher per cycle.

The conversion of $H_2$ may be about 10% or higher per cycle, and in one embodiment about 30% or higher, and in one embodiment about 50% or higher per cycle.

The yield of hydrogen peroxide may be about 10% or higher per cycle, and in one embodiment about 30% or higher, and in one embodiment about 50% or higher per cycle.

In one embodiment, the conversion of $O_2$ is at least about 30%, the conversion of $H_2$ is at least about 30%, and the yield of hydrogen peroxide is at least about 30% per cycle.

Unlike conventional reaction vessels for the direct production of hydrogen peroxide from $O_2$ and $H_2$ which have to take into account the possibility of explosions as a result of the use of $O_2$ and $H_2$, the possibility of such explosions with the inventive process is of less concern. This is believed to be due to the relatively brief catalyst contact times employed in the process microchannels, the added cooling provided by the heat exchanger, and the dimensions of the microchannels which make them effective flame arresters reducing or preventing the propagation of combustion reactions and flames that would normally lead to explosions and/or detonations.

While the invention has been explained in relation to various embodiments, it is to be understood that various modifications thereof will become apparent to those skilled in the art upon reading the specification. Therefore, it is to be understood that the invention disclosed herein is intended to cover such modifications as fall within the scope of the appended claims.

The invention claimed is:

1. A process for making hydrogen peroxide, comprising: mixing a process feed stream comprising $O_2$ or $H_2$ with a staged addition feed stream $O_2$ or $H_2$ in a process microchannel to form a reactant mixture comprising $O_2$ and $H_2$, and contacting a catalyst with the reactant mixture in the process microchannel to convert the reactant mixture to a product comprising hydrogen peroxide;

transferring heat from the process microchannel to a heat exchanger; and removing the product from the process microchannel.

2. The process of claim 1 wherein the staged addition feed stream flows through a staged addition microchannel, the staged addition microchannel being adjacent to the process microchannel, the process microchannel having an entrance for the process feed stream, the staged addition feed stream entering the process microchannel downstream of the entrance.

3. The process of claim 1 wherein the catalyst is positioned within a reaction zone in the process microchannel, the staged addition feed stream contacting the process feed stream in the reaction zone.

4. The process of claim 1 wherein the catalyst is positioned within a reaction zone in the process microchannel, the staged addition feed stream contacting the process feed stream in a mixing zone in the process microchannel upstream from the reaction zone.

5. The process of claim 1 wherein the catalyst is positioned within a reaction zone in the process microchannel, part of the staged addition feed stream contacting the process feed stream in the reaction zone, and part of the staged addition feed stream contacting the process feed stream in a mixing zone upstream from the reaction zone.

6. The process of claim 1 wherein the process microchannel has an internal dimension of width or height of up to about 10 mm.

7. The process of claim 1 wherein the process microchannel is made of a material comprising: steel; monel; inconel; aluminum; titanium; nickel; copper; brass; an alloy of any of the foregoing metals; a polymer; ceramics; glass; a composite comprising a polymer and fiberglass; quartz; silicon; or a combination of two or more thereof.

8. The process of claim 1 wherein the heat exchanger comprises a heat exchange channel adjacent to the process microchannel.

9. The process of claim 8 wherein the heat exchange channel comprises a microchannel.

10. The process of claim 9 wherein the heat exchange microchannel has an internal dimension of width or height of up to about 10 mm.

11. The process of claim 8 wherein the heat exchange channel is made of a material comprising: steel; monel; inconel; aluminum; titanium; nickel; copper; brass; an alloy of any of the foregoing metals; a polymer; ceramics; glass; a composite comprising polymer and fiberglass; quartz; silicon; or a combination of two or more thereof.

12. The process of claim 1 wherein the process microchannel is in a microchannel reactor, the microchannel reactor having an entrance and an exit, the product exiting the microchannel reactor through the exit, the product containing unreacted $O_2$ and/or $H_2$ intermixed with the hydrogen peroxide, at least part of the unreacted $O_2$ and/or $H_2$ being recycled to the entrance to the microchannel reactor.

13. The process of claim 1 wherein the temperature of the process feed stream entering the process microchannel is within about 200° C. of the temperature of the product exiting the process microchannel.

14. The process of claim 1 wherein the total mole ratio of $H_2$ to $O_2$ in the process feed stream and in the staged addition feed stream entering the process microchannel is in the range of about 0.1 to about 10.

15. The process of claim 1 wherein the process feed stream comprises $O_2$ and further comprises one or more of water, methane, carbon monoxide, carbon dioxide or nitrogen.

16. The process of claim 1 wherein the process feed stream comprises $H_2$ and further comprises one or more of water, methane, carbon monoxide, carbon dioxide or nitrogen.

17. The process of claim 1 wherein the staged addition feed stream comprises $O_2$ and further comprises one or more of water, methane, carbon monoxide, carbon dioxide or nitrogen.

18. The process of claim 1 wherein the staged addition feed stream comprises $H_2$ and further comprises one or more of water, methane, carbon monoxide, carbon dioxide or nitrogen.

19. The process of claim 8 wherein the process microchannel exchanges heat with a heat exchange fluid flowing through the heat exchange channel.

20. The process of claim 19 wherein the heat exchange fluid undergoes a phase change as it flows through the heat exchange channel.

21. The process of claim 20 wherein the heat flux between the heat exchange channel and the process microchannel is in the range of about 1 to about 50 watts per square centimeter of surface area of the process microchannel.

22. The process of claim 21 wherein the heat exchange fluid comprises water.

23. The process of claim 21 wherein the heat exchange channel has a length of up to about 1.5 meters.

24. The process of claim 21 wherein the heat exchange channel has a length of up to about 1 meter.

25. The process of claim 20 wherein up to about 50% of the heat exchange fluid is boiling.

26. The process of claim 8 wherein an endothermic process is conducted in the heat exchange channel.

27. The process of claim 26 wherein the endothermic process comprises a steam reforming reaction or a dehydrogenation reaction.

28. The process of claim 8 wherein a process fluid flows through the process microchannel in a first direction, and a heat exchange fluid flows through the heat exchange channel in a second direction, the second direction being cross current relative to the first direction.

29. The process of claim 8 wherein a process fluid flows through the process microchannel in a first direction, and a heat exchange fluid flows through the heat exchange channel in a second direction, the second direction being cocurrent relative to the first direction.

30. The process of claim 8 wherein a process fluid flows through the process microchannel in a first direction, and a heat exchange fluid flows through the heat exchange channel in a second direction, the second direction being counter current relative to the first direction.

31. The process of claim 8 wherein a heat exchange fluid flows through the heat exchange channel, the heat exchange fluid comprising air, steam, liquid water, carbon dioxide, gaseous nitrogen, liquid nitrogen, a gaseous hydrocarbon or a liquid hydrocarbon.

32. The process of claim 1 wherein the catalyst comprises a metal from Group VIII of the Periodic Table, or an oxide thereof, or a mixture of two or more thereof.

33. The process of claim 1 wherein the catalyst comprises Fe, Co, Ni, Ru, Rh, Pd, Os, Ir, Pt, or an oxide thereof, or a combination of two or more thereof.

34. The process of claim 1 wherein the catalyst comprises Pd, Pt, or an oxide thereof, or a mixture of two or more thereof.

35. The process of claim 1 wherein the catalyst comprises a support selected from ceramic, alumina, zirconia, silica, aluminum fluoride, bentonite, ceria, zinc oxide, silica-alumina, silicon carbide, refractory oxide, molecular sieves, diatomaceous earth, or a combination of two or more thereof.

36. The process of claim 1 wherein the catalyst comprises Pd or an oxide thereof supported on a ceramic support.

37. The process of claim 1 wherein the catalyst is in the form of particulate solids.

38. The process of claim 1 wherein the catalyst is washcoated on interior walls of the process microchannel, grown on interior walls of the process microchannel from solution, or coated in situ on a fin structure.

39. The process of claim 1 wherein the catalyst comprises a support, an optional buffer layer overlying the support, an interfacial layer overlying the optional buffer layer or the support, and a catalyst material dispersed or deposited on the interfacial layer.

40. The process of claim 1 wherein the catalyst is supported by a support, the support being made of a material comprising silica gel, foamed copper, sintered stainless steel fiber, steel wool, alumina, poly(methyl methacrylate), polysulfonate, poly(tetrafluoroethylene), iron, nickel sponge, nylon, polyvinylidene difluoride, polypropylene, polyethylene, polyethylene ethylketone, polyvinyl alcohol, polyvinyl acetate, polyacrylate, polymethylmethacrylate, polystyrene, polyphenylene sulfide, polysulfone, polybutylene, or a combination of two or more thereof.

41. The process of claim 1 wherein the catalyst is supported on a support, the support being made of a heat conducting material.

42. The process of claim 1 wherein the catalyst is supported on a support made of a material comprising an alloy comprising Ni, Cr and Fe, or an alloy comprising Fe, Cr, Al and Y.

43. The process of claim 1 wherein the catalyst is supported on a support having a flow-by configuration, a flow-through configuration, a honeycomb structure or a serpentine configuration.

44. The process of claim 1 wherein the catalyst is supported on a support having the configuration of a foam, felt, wad, fin, or a combination of two or more thereof.

45. The process of claim 1 wherein the catalyst is supported on a support structure having a flow-by configuration with an adjacent gap, a foam configuration with an adjacent gap, a fin structure with gaps, a washcoat on a substrate, or a gauze configuration with a gap for flow.

46. The process of claim 1 wherein the catalyst is supported on a support structure in the form of a fin assembly comprising at least one fin.

47. The process of claim 46 wherein the fin assembly comprises a plurality of parallel spaced fins.

48. The process of claim 46 wherein the fin has an exterior surface and a porous material overlies at least part of the exterior surface of the fin, the catalyst being supported by the porous material.

49. The process of claim 46 wherein the porous material comprises a coating, fibers, foam or felt.

50. The process of claim 46 wherein the fin has an exterior surface and a plurality fibers or protrusions extend from at least part of the exterior surface of the fin, the catalyst being supported by the protrusions.

51. The process of claim 46 wherein the fin has an exterior surface and the catalyst is: washcoated on at least part of the exterior surface of the fin; grown on at least part of the exterior surface of the fin from solution; or deposited on at least part of the exterior surface of the fin using vapor deposition.

52. The process of claim 46 wherein the fin assembly comprises a plurality of parallel spaced fins, at least one of the fins having a length that is different than the length of the other fins.

53. The process of claim 46 wherein the fin assembly comprises a plurality of parallel spaced fins, at least one of the fins having a height that is different than the height of the other fins.

54. The process of claim 46 wherein the fin has a cross section having the shape of a square, a rectangle, or a trapezoid.

55. The process of claim 46 wherein the fin is made of a material comprising: steel; aluminum; titanium; iron; nickel; platinum; rhodium; copper; chromium; brass; an alloy of any of the foregoing metals; a polymer; ceramics; glass; a composite comprising polymer and fiberglass; quartz; silicon; or a combination of two or more thereof.

56. The process of claim 46 wherein the fin is made of an alloy comprising Ni, Cr and Fe, or an alloy comprising Fe, Cr, Al and Y.

57. The process of claim 46 wherein the fin is made of an $Al_2O_3$ forming material or a $Cr_2O_3$ forming material.

58. The process of claim 1 wherein the catalyst is positioned within a reaction zone in the process microchannel, the reaction zone being characterized by a bulk flow path comprising about 5% to about 95% of the cross section of the process microchannel.

59. The process of claim 1 wherein the contact time for the process feed stream, staged addition feed stream and product with the catalyst is up to about 500 milliseconds.

60. The process of claim 1 wherein the temperature within the process microchannel is in the range of about 50° C. to about 400° C.

61. The process of claim 1 wherein the pressure within the process microchannel is up to about 100 atmospheres.

62. The process of claim 1 wherein the space velocity for the flow of process feed stream, staged addition feed stream and product through the process microchannel is at least about 10000 $hr^{-1}$.

63. The process of claim 1 wherein the pressure drop for the flow of process feed stream, staged addition feed stream and product through the process microchannel is up to about 100 atmospheres per meter of length of the process microchannel.

64. The process of claim 8 wherein a heat exchange fluid flows through the heat exchange channel, the pressure drop for the heat exchange fluid flowing through the heat exchange channel being up to about 100 atmospheres per meter of length of the heat exchange channel.

65. The process of claim 1 wherein the conversion of $O_2$ is about 10% or higher per cycle.

66. The process of claim 1 wherein the conversion of $H_2$ is about 10% or higher per cycle.

67. The process of claim 1 wherein the yield of hydrogen peroxide is about 10% or higher per cycle.

68. The process of claim 1 wherein the product further comprises water, the concentration of hydrogen peroxide in the product being from about 1 to about 70% by weight.

69. The process of claim 1 wherein subsequent to removing the product from the process microchannel a regenerating fluid flows through the process microchannel in contact with the catalyst, the residence time for the regenerating fluid in the process microchannel being from about 0.001 to about 10 seconds.

70. A process for making hydrogen peroxide, comprising:
mixing a process feed stream $O_2$ or $H_2$ with a staged addition feed stream $O_2$ or $H_2$ in a process microchannel to form a reactant mixture comprising $O_2$ and $H_2$, and contacting a catalyst with the reactant mixture in the process microchannel to convert the reactant mixture to a product comprising hydrogen peroxide; the process microchannel having an internal height or width in the range of about 0.2 to about 10 mm; the catalyst being contained within a reaction zone in the process microchannel; the staged addition feed stream and the process feed stream being mixed with each other in a mixing zone in the process microchannel upstream from the reaction zone;
transferring heat from the process microchannel to an adjacent heat exchange microchannel; and
removing the product from the process microchannel.

* * * * *